Dec. 18, 1951 D. V. EDWARDS 2,579,374

POWER CONVERSION DEVICE OF THE VACUUM TUBE TYPE

Filed March 15, 1947 11 Sheets-Sheet 1

INVENTOR.
D. V. Edwards,
BY
Neil W. Preston,
his ATTORNEY

INVENTOR.
D. V. Edwards,
BY Neil D. Preston,
his ATTORNEY

Dec. 18, 1951 D. V. EDWARDS 2,579,374

POWER CONVERSION DEVICE OF THE VACUUM TUBE TYPE

Filed March 15, 1947 11 Sheets-Sheet 3

INVENTOR.
D. V. Edwards,
BY Neil W. Preston,
his ATTORNEY

Dec. 18, 1951 D. V. EDWARDS 2,579,374

POWER CONVERSION DEVICE OF THE VACUUM TUBE TYPE

Filed March 15, 1947 11 Sheets-Sheet 4

INVENTOR.

BY D. V. Edwards,

Neil W. Preston, his ATTORNEY

INVENTOR.
D. V. Edwards,
BY
Neil D. Preston,
his ATTORNEY

Dec. 18, 1951 D. V. EDWARDS 2,579,374

POWER CONVERSION DEVICE OF THE VACUUM TUBE TYPE

Filed March 15, 1947 11 Sheets-Sheet 6

INVENTOR.
D. V. Edwards,
BY Neil W. Preston,
his ATTORNEY

POWER CONVERSION DEVICE OF THE VACUUM TUBE TYPE

Filed March 15, 1947 11 Sheets-Sheet 7

INVENTOR.
D. V. Edwards
BY Neil W. Preston,
his ATTORNEY

INVENTOR.
D. V. Edwards,
BY
Neil W. Preston,
his ATTORNEY

Inventor
D. V. Edwards,
By
Neil D. Preston,
his Attorney

POWER CONVERSION DEVICE OF THE VACUUM TUBE TYPE

Filed March 15, 1947

Inventor
D. V. Edwards,
By
Neil W. Preston,
his Attorney

Dec. 18, 1951 D. V. EDWARDS 2,579,374

POWER CONVERSION DEVICE OF THE VACUUM TUBE TYPE

Filed March 15, 1947 11 Sheets-Sheet 11

Inventor

D. V. Edwards,

By Neil W. Preston, his Attorney

Patented Dec. 18, 1951

2,579,374

UNITED STATES PATENT OFFICE 2,579,374

POWER CONVERSION DEVICE OF THE VACUUM TUBE TYPE

Donald V. Edwards, Montclair, N. J., assignor to General Railway Signal Company, Rochester, N. Y.

Application March 15, 1947, Serial No. 734,965

22 Claims. (Cl. 250—36)

This invention relates to power conversion devices of the vacuum tube type, and more particularly to vacuum tube power conversion devices for direct current and alternating current, such as in power oscillators, inverters, controlled rectifiers, and the like.

When employing a high vacuum tube, as distinctive from a gas discharge tube, in power conversion devices, as for example in a power oscillator, the losses in the tube impose limitations upon the efficiency of the conversion operation. Disregarding the energy required for cathode heating, these tube losses may be said to be represented by the integration of the product of instantaneous anode currents, the instantaneous voltages between the anode and cathode of the tube during its conduction period, together with losses due to the flow of grid current existing during such conduction period. In the high vacuum tube, the anode current is dependent upon the space charge effect as well as the anode voltage, and does not vary directly with the anode-to-cathode voltage, but rather in accordance with the familiar three-halves law. Accordingly, when using a vacuum tube for power conversion devices, it is desirable in the interests of high plate efficiency that the anode current should be conducted through the tube with a low ratio of peak to average value of the anode-to-cathode voltage during the conduction period, that is, at an essentially uniform tube drop, and that the desired power output be obtained by prolonging the period of conducion, in contrast with supplying the same amount of power to a load by a short current pulse having peaked values or wide variations in its instantaneous value. These general statements will have added significance as the nature and mode of operation of the present invention are further explained.

To indicate the nature of the present invention by way of contrast, in the vacuum tube circuit organizations with which I am familiar, and which are proposed for power amplifiers or oscillators of high plate voltage efficiency, such as the familiar Class C amplifier, it is attemped to obtain low tube losses by employing a large negative biasing voltage in connection with a sinusoidal control voltage for the grid of the tube which will permit current to flow to the output circuit for a short time in the cycle when the anode voltage is low. In these circuit organizations, the instantaneous anode voltage varies with the sine wave of the output voltage; and hence there is a relatively small part of the cycle where the anode voltage is low and current can be supplied through the tube at a low tube drop. Consequently, the current is supplied to the load in the form of relatively short impulses. If it is attempted to increase the power output by prolonging these current impulses, the instantaneous anode voltage, which is the difference between the voltage of the direct current source and the sine wave of output voltage, varies materially during the period of conduction; and since the instantaneous anode current does not vary directly with the instantaneous tube drop voltage, but rather with the three-halves power, the summation of the widely varying instantaneous tube losses represents a large total loss in the tube for the power output. Also, when the current impulses to the load are prolonged, the sine wave of voltage on the grid of the tube causes the grid to assume substantial positive potentials, and the electron current to the grid represents additional input losses, and also requires special grid control means to provide the necessary grid driving power.

In view of these factors relating to the efficiency of power conversion devices of the vacuum tube type, the primary object of this invention is to provide an organization of tubes and circuit elements in which power is supplied through the tubes at a relatively low and essentially uniform tube drop for a prolonged conduction period, and with a minimum of grid circuit losses.

Another object of the invention is to provide a circuit organization for power conversion devices which enable a larger output to be obtained from the same tubes at smaller tube losses than in previous circuit organizations, such as exemplified by the class C amplifier.

A further object of the invention is to provide a power conversion device, such as an oscillator or inverter, which has a restricted variation in its output voltage under varying loads, and hence superior voltage regulation characteristics.

A still further object of the invention is to obtain these and other desirable objectives by using conventional circuit elements which may be readily and economically produced and assembled in combination with the appropriate type of tube to provide a power conversion device of high efficiency.

Various other objects, characteristic features, attributes and advantages of the invention will be in part apparent, and in part pointed out as the description progresses.

Generally speaking, and without attempting to define the nature and scope of the invention, it is proposed to employ a plurality of high vacuum triodes or equivalent electron discharge tubes, which are capable of providing substantial anode currents at a relatively low anode-to-cathode voltage when conducting, in a push-pull or equivalent type of circuit organization, in conjunction with an inductor of relatively large inductance capable of maintaining continuous current through the tubes throughout a half-cycle, and to utilize suitable means for providing control voltages for the grids of the tubes which have quickly changing or steep wave fronts, essentially in the form of square-wave voltage pulses, so that anode current flows through each tube alternately throughout a half-cycle of the alternating voltage at a relatively low and essentially uniform tube drop and with a minimum of grid circuit losses. This is merely a general explanatory statement of the nature of the invention, and various modifications or adaptations may be made in the organization thus described without departing from the invention.

The accompanying drawings illustrate certain specific embodiments of the invention, together with explanatory graphs or curves of voltage and current; and the parts and circuits are shown in these drawings diagrammatically and in accordance with certain conventions, more with the purpose of facilitating an explanation and understanding of the nature of the invention and its mode of operation, than to illustrate in detail the particular construction and arrangement of parts preferably employed in practice.

In these drawings.

This invention may be applied to various circuit organizations for converting direct current into alternating current, or in connection with controlled rectifiers, as later explained; but for the purposes of explanation a typical organization for a self-excited power oscillator has been shown in Fig. 1. In this type of oscillator, which may be employed for induction heating or similar purposes, two power tubes PT1 and PT2 of the appropriate high vacuum grid control type are connected in a push-pull arrangement with an inductor L of comparatively large inductance; and a suitable grid control means, indicated schematically in block form at GC, serves to provide a quickly changing or essentially square waves of grid voltage for governing the potentials on the grids of these power tubes in the desired phase relation to the output circuit. The power tubes PT1 and PT2 may be of any suitable type capable of providing the desired anode currents at the low anode voltages characterizing the invention without objectionable grid current losses; and while the desirable characteristics are found to a certain extent in conventional power triodes, it is preferred to employ a tube of the type, conventionally termed a magnatriode and later described, which is capable of providing substantial anode currents at low voltages without appreciable grid current losses.

Figure 1:
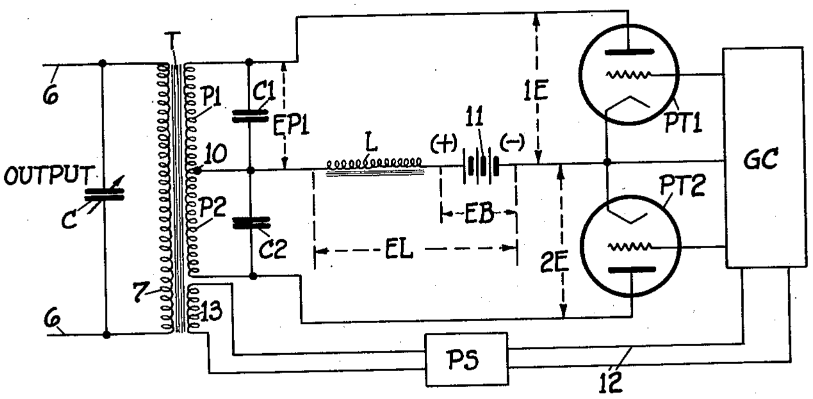
Fig. 1 illustrates generally a typical circuit organization characteristic of the invention as applied to an oscillator.

In a specific circuit organization shown in Fig. 1, it is assumed that the wires 6 constitute an output circuit for a suitable load, and these wires are connected to the secondary 7 of an output transformer T of the usual type. It is contemplated that this circuit organization will include a tuned output circuit, and as shown in Fig. 1, the secondary 7 of the output transformer T is tuned to the desired frequency by a suitable capacitor C, which may be adjustable as indicated to vary the output frequency as desired. It may be said that in effect this tuned secondary 7 of the output transformer T, together with the inductance and capacity coupled therewith, constitutes the tank circuit for the oscillator.

The primary winding of the output transformer T has a center tap connection 10, so that there are in effect two like opposing primary windings P1 and P2. This center tap 10 or common terminal of the primaries P1 and P2 is connected to the cathodes of the power tubes PT1 and PT2 in series with a reactor or inductor L of relatively large inductance and a suitable source of direct current power supply, indicated as a battery 11; and the anodes of these tubes PT1 and PT2 are connected to the other terminals of the respective primaries P1 and P2, as can be readily understood from the drawings.

The excitation of the control electrodes or grids of the power tubes PT1 and PT2 is governed by a suitable grid control means, illustrated schematically in block form at GC, which is suitably constructed, as later described, to provide grid potentials quickly changing between essentially uniform positive and negative values for full conduction and non-conduction respectively at half-cycle intervals of the output voltage, such as indicated by the grid voltage curves in Fig. 3C. In other words, the grid control means GC provides essentially square wave excitation of the grids of the power tubes PT1 and PT2 in the desired phase relation to the output voltage. In the organization for a self-excited oscillator assumed in Fig. 1, this grid control means GC, which may take various forms as later discussed, is connected to a secondary 13 of the output transformer T by wires 12; and if desired, a phase shifting device, illustrated schematically in block form at PS, may be included in the circuit connection provided by wires 12 for the grid control means GC, for the purpose later discussed.

Before considering the specific form of the grid control means GC contemplated, or the magnatriode type of tube preferably employed for the power tubes PT1 and PT2, it is considered expedient to outline the principles and mode of operation of the invention, as exemplified in the oscillator organization shown in Fig. 1. In describing these features and the mode of operation, it is convenient to refer to certain curves of voltage and current illustrated in Figs. 3A to 3D. It should be understood that these curves are merely representative of certain typical operating characteristics of the invention, and may be quite different for other types of circuit organizations embodying the invention and for different load conditions. Also, these curves are presented merely for explanatory purposes, and are not intended to be quantitatively accurate as to wave shape, but are rather somewhat idealized in the interest of simplicity.

Figures 3A, 3B, 3C, 3D:
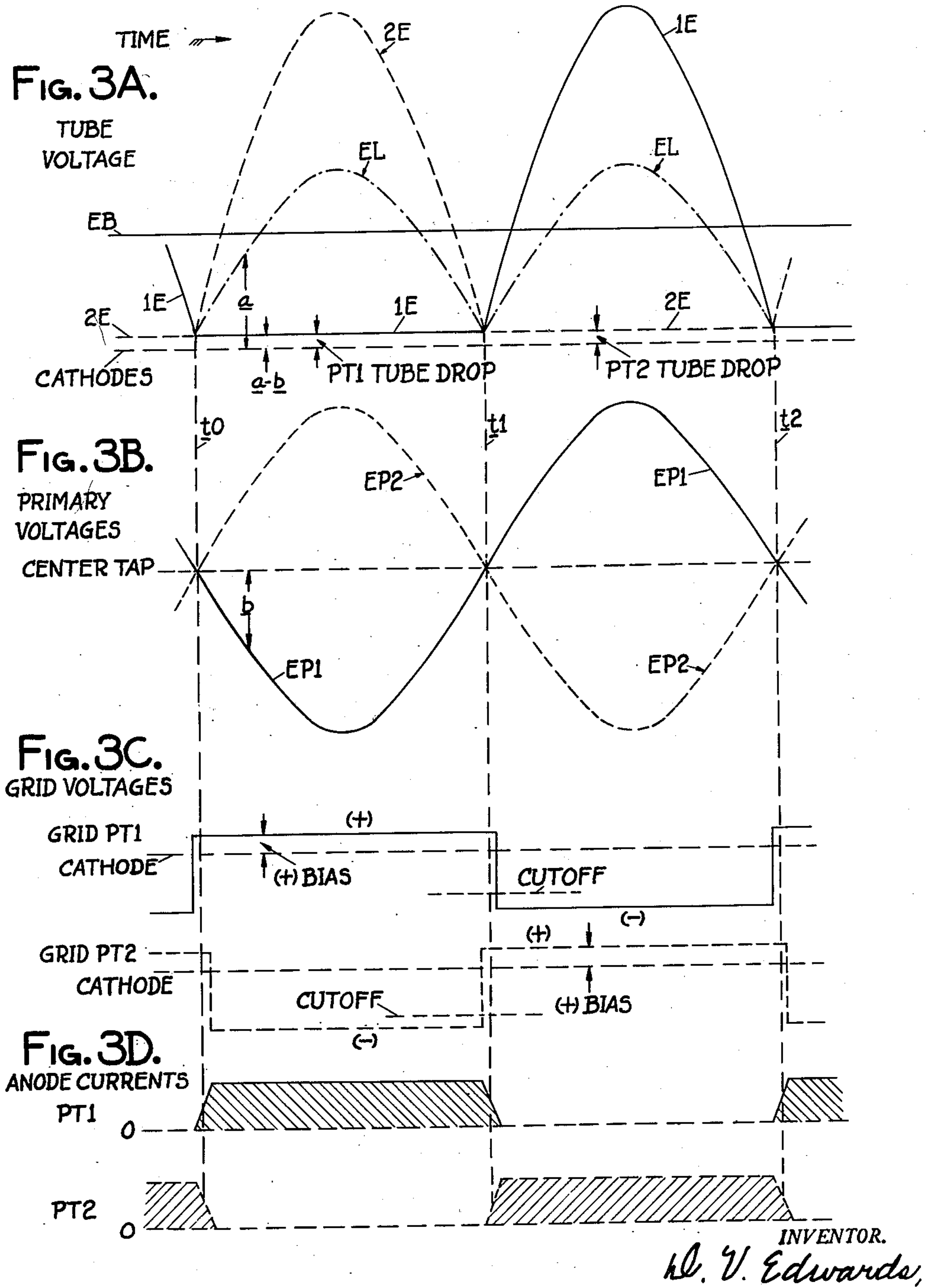
Figs. 3A to 3D illustrate diagrammatically for explanatory purposes graphs or curves of certain voltages and currents involved in the circuit organization of Fig. 1.

Referring to Figs. 3A to 3D, these curves of voltage and current shown relate to the steady state condition for one cycle of voltage of the output transformer for a moderate load. Fig. 3A illustrates, with the cathodes of the tubes PT1 and PT2 as the reference point, the voltages 1E and 2E across the anode and cathode of the respective tubes, including the drop across each tube when conducting, together with the fixed voltage EB of the battery 11, and the instantaneous voltage EL across this battery 11 and the inductor L, corresponding with the voltages 1E, 2E and EL indicated in Fig. 1. Fig. 3B illustrates for the same cycle the instantaneous voltages across the primaries P1 and P2 of the output transformer T with respect to their center tap 10, corresponding with the voltages indicated at EP1 and EP2 in Fig. 1. Fig. 3C illustrates the grid voltage curves for the power tubes PT1 and PT2 for the same cycle; and Fig. 3D shows the anode current supplied by these tubes. For convenient reference the curves relating to one power tube PT1 are shown in solid lines, and those relating to the other power tube PT2 in dash lines; and the voltage EL across the battery 11 and inductor L is indicated in dash and dot lines.

One significant characteristic of this invention is that the grids of the power tubes PT1 and PT2 are controlled so that these tubes are quickly or abruptly changed from a condition of cut-off and non-conduction to what may be termed full conduction, and vice versa. In other words, these power tubes PT1 and PT2 are so controlled that they will provide full conduction current for the existing anode-to-cathode voltage throughout their conduction periods, rather than a current of variable amplitude changing with grid potential. Referring to the curves in Figs. 3A and 3B, it is assumed that the tube PT1 is conductive during the first half cycle from the time *t0* to *t1*; and the grid control means GC for governing the potential on the grid of this tube PT1 is arranged as later explained so that at the time *t0* the potential on this grid is quickly or abruptly shifted from some negative value beyond the cut off grid potential for this tube to some positive potential to render this tube fully conductive. The positive potential for rendering the tube PT1 fully conductive is maintained at a substantially uniform value, as indicated in Fig. 3C, throughout the conduction period from the time *t0* to the time *t1*, whereupon the potential on the grid of the tube PT1 is quickly shifted to some negative value beyond cut off. The grid of the other power tube PT1 is controlled in a similar manner for its conduction period, which is assumed to occur from the time *t1* to the time *t2* during the other half-cycle of the transformer voltage.

In other words, in accordance with this invention essentially square wave grid excitation is employed for the power tubes PT1 and PT2, rather than a variable or sinusoidal grid control voltage characteristic of other oscillators, such as the Class C oscillator. In this connection, it is desirable that the grid potential during the conduction periods of the power tubes PT1 and PT2 should be essentially uniform, and the positive half cycle of grid control voltae is preferably flat topped. The variations in the negative grid potential during the non-conducting period, however, is not material, so long as this negative potential is more than cut off. Accordingly, if desired, the grid control means may provide a flat topped positive grid control voltage and a negative grid control voltage of variable amplitude.

Another significant characteristic feature of this invention relates to the use of an inductor L of relatively large inductance in series with the battery 11, or equivalent direct current source, which supplies current to the load through the opposing primaries P1 and P2 and the power tubes PT1 and PT2 alternately during successive half-cycles. In accordance with this invention, this inductor L has a relatively large inductance, which may be said to be at least large enough to maintain continuous current through the power tubes PT1 and PT2 throughout a half-cycle at the lowest operating frequency. Stated another way, it may be said that the inductor L of this invention should have enough inductance to prevent the current through it and in the plate circuits of the power tubes PT1 and PT2 falling to zero. Although it is impracticable to specify definite values of inductance for the inductor L applicable to various cases, a suitable inductance to accomplish the desired object of maintaining continuous current throughout a half-cycle at the lowest operating frequency can be readily calculated, or determined by tests for a given operating set-up.

Considering the function of this inductor L in the circuit organization of Fig. 1, this inductor acts in the usual way to provide a counter E. M. F. to oppose voltages in its circuit as the current increases through the inductor, and to create a voltage in the opposite direction when current decreases. In this respect, the inductor L acts like the smoothing inductance as used in rectifier circuits and the like; but in the circuit organization of this invention, however, this inductor L cooperates with the other elements of the circuit in a distinctive manner to provide a substantially uniform anode-to-cathode voltage or tube drop for the power tubes PT1 and PT2 during their periods of conduction, which is so desirable for high plate efficiency, as previously discussed.

Considering in a general way the action of the inductor L in the circuit organization of Fig. 1, and assuming steady state conditions for a given load, as represented in the curves of Figs. 3A and 3B, it can be seen from the circuit of Fig. 1 that, while the tube PT1 is conducting, the voltages existing in its plate circuit comprise the fixed voltage of the battery 11, the instantaneous voltage in the primary P1, and the instantaneous voltage across the inductor L. Under these steady state conditions, where there is a given alternating output current in the tuned load circuit, the instantaneous voltage in the primary P1 is varying throughout a negative half-cycle during the time from $t0$ to $t1$ while the tube PT1 is conducting, as indicated by the curve EP1 in Fig. 3B. Thus, the voltage EB of the battery 11 is opposed by the varying negative voltage EP1 in the primary P1 of the output transformer, as well as by the voltage drop of the current through the resistance of the circuit. These voltages alone in the circuit would result in a sinusoidal variation in the anode voltage for the tube PT1, characteristic of the typical vacuum tube circuit. In the circuit organization of this invention, however, the inductor L with its relatively large inductance tends to oppose any increase or decrease of current through it and in the circuit through the primary P1 and tube PT1; and generally speaking this inductor L acts to generate instantaneous voltages opposing the instantaneous primary voltage EP1, so as to maintain a uniform resultant voltage in the circuit and a uniform current. In other words, it may be said that the exciting current through the inductor L tends to adjust itself to generate instantaneous voltages opposing and balancing changes in the instantaneous primary voltage EP1.

If the inductor L has sufficient inductance to maintain a continuous flow of current through it and in the plate circuit of the tube PT1 throughout a half-cycle, as contemplated in accordance with this invention, the instantaneous voltage across the inductor L rises and falls, as indicated by the curve EL in Fig. 3A with the line 2E as an axis, so as to oppose the approximate sinusoidal variations in the instantaneous voltage EP1 in the primary P1 during the half-cycle in question. In this connection, disregarding losses in the inductor L, it may be assumed that this voltage curve EL has such a shape that the area above the line EB is equal to the area below this line.

The net result of this action of the inductor L of relatively large inductance is that the tube drop for the tube PT1, i. e. its anode to cathode voltage during its conduction period, is essentially uniform, as shown by the voltage 1E in Fig. 3A for the period of conduction through the tube PT1 from time $t0$ to $t1$. In other words, the tube drop for tube PT1 is the difference between the instantaneous voltage EL and the instantaneous voltage EP1 in the primary P1; and for a given instant, represented by the ordinants $a$ and $b$ in Figs. 3A and 3B, the tube drop corresponds with $a—b$.

The use of an inductor L of large inductance to maintain continuous current through it as conduction through the power tubes PT1 and PT2 is started and stopped, for the reasons just explained, makes it important that there should always be a circuit path for the flow of current from this inductor L, otherwise excessive surge voltages may be generated by this inductor when an existing circuit through it is interrupted by stopping conduction through one of the power tubes PT1 or PT2. One suitable and preferable arrangement for this purpose is to control the power tubes PT1 so that conduction through either of these tubes is not cut off until the other tube is rendered conductive, thereby providing a circuit path for current from the inductor L through one tube or the other. Any suitable arrangement or organization of circuit elements may be employed for this purpose, however, without departing from the invention. In this connection, the inherent leakage reactance of the primary windings P1 and P2 is capable under some conditions of creating voltage surges, when conduction through the respective tubes PT1 and PT2 is cut off, that might be damaging to the tubes or other parts of the circuit; and since there is no circuit path for the current generated by such leakage reactance, it may be necessary to shunt the primary windings P1 and P2 by small capacitors C1 and C2 of sufficient capacity to limit the peak value of such voltage surges.

The tube drop for the power tubes PT1 and PT2, or the anode-to-cathode voltage during their conduction periods, is automatically regulated by the inductor L to correspond with the current required for the load. An increase in the load calling for more output current may be considered as acting in effect to add losses to the circuits of the primaries P1 and P2 and the tubes PT1 and PT2; and the instantaneous voltage across the inductor L adjusts itself to allow sufficient current to flow for such increased losses. Accordingly, the tube drop, represented by the difference between the instantaneous voltage across the inductor L and the instantaneous values of the negative sine wave of primary voltages EP1 and EP2, increases to permit the tubes PT1 and PT2 to provide the increased anode current demanded by the load. Changes in the load may affect the operating frequency of the oscillator, but the power tubes PT1 and PT2 will continue to conduct alternately for full half-cycles to supply the load current required, with the corresponding variations in the tube drop.

The power tubes PT1 and PT2 are of the hard vacuum type, and conduction through them may be stopped as well as started by control of their grids at any point in the cycle. Consequently, variations in the power factor of the load will not affect the conduction periods of these tubes, as in the case of gas discharge tubes, where conduction may be started but not cut off by grid control. In this connection, the relatively large inductance of the inductor L serves to maintain conduction through the tubes PT1 and PT2 through the periods of conduction defined by control of their grids, and not dependent upon the primary voltages EP1 and EP2 alone. This attribute of the invention of providing conduction through the power tubes alternately for a full half-cycle or 180° at the operating frequency enables phase shifting of these conduction periods with respect to the transformer voltages to be used to advantage, as later discussed.

From this explanation of the function of the inductor L, in connection with the essentially square-topped wave excitation contemplated for the grids of the power tubes PT1 and PT2, the general mode of operation of the invention as applied to the oscillator organization of Fig. 1 can be readily appreciated. At the beginning of a given half-cycle, such as represented by the time $t0$ in Figs. 3A to 3D, the grid potential on one tube PT1 is abruptly changed to render that tube conductive, and the grid potential on the other tube PT2 is also abruptly changed to stop conduction through that tube. This same control of the grids of the tubes PT1 and PT2 is maintained throughout the half-cycle until the time $t1$, so that the tube PT1 conducts for the full 180° of this half-cycle, while the other tube PT2 is cut off. The tube drop, i. e. the voltage 1E across the tube PT1 while it is conducting, is maintained essentially uniform by the inductor L, while the voltage 2E across the other tube PT2 rises, as indicated in Fig. 3A, to a value approximately equal to the sum of the voltages EP1 and EP2 of the primaries P1 and P2 of the output transformer T. The tube PT1 supplies a block of current of essentially uniform amplitude to the load throughout this half-cycle, as indicated in Fig. 3D.

At the time $t1$, corresponding to the beginning of the next half-cycle of the output voltage, the same operation is repeated with the control of the grids of the tubes PT1 and PT2 reversed. The tube PT2 is made conductive and the tube PT1 is cut off. The tube drop for the tube PT2 remains essentially uniform, while a sine wave of inverse voltage of approximately double the primary voltage is applied across tube PT1. The tube PT2 supplies a block of current of essentially uniform amplitude to the load throughout this half-cycle from the time $t1$ and $t2$, as indicated in Fig. 3D.

In short, due to the square-wave excitation of the grids of the power tubes PT1 and PT2 and the action of the inductor L, the tubes PT1 and PT2 act alternately to supply blocks of current of essentially uniform amplitude to the load for the full 180° of the successive half-cycles.

The power tubes PT1 and PT2 operate at a high plate efficiency under the operating conditions characteristic of this invention, because of the low losses through the tubes for a given power output. The losses through each tube PT1 and PT2 may be said to be represented by the integration of the instantaneous voltages and currents during the period of conduction. Since the current is coducted by each tube for the maximum time of the 180° of the positive half-cycle during which it may conduct, the average current is a minimum for a given power output. The tube drop, or voltage of anode-to-cathode while the tube is conducting, is essentially uniform, and has a high ratio of average to peak value, so that the instantaneous tube losses, represented by the product of instantaneous voltage and current, are substantially lower than where the tube drop has a sinusoidal variation, as in the class C amplifier for example, and where the instantaneous tube losses increase with an increase of the tube drop, due to the three-halves power relation of current and voltage in a vacuum tube. These combined factors enable high plate efficiencies in the order of 95 or more per cent to be obtained in the organization of this invention, disregarding heating current for the cathodes of the tubes and grid circuit losses.

Another advantageous feature of this invention is that the relatively low anode currents for a given output are favorable to heat dissipation from the anodes. Also, since the voltage drop through each power tube PT1 and PT2 while conducting is small compared to the other voltages in the circuit, changes in this voltage drop due to changes in the load have less effect upon the output voltage, so that the organization has superior voltage regulation characteristics.

In conventional high vacuum power triodes, in order to obtain substantial currents at low anode voltages, characteristic of this invention, relatively high positive potentials on the grid of the tube are required; and when the grid voltage has the sinusoidal variation characteristic of the class C oscillator, such positive potentials on the grid result in high input losses due to grid current. Also, when high positive grid potentials are used in the ordinary high vacuum triode, a substantial part of the electron current is diverted from the anode to the grid. When the circuit organization of this invention is used for conventional triodes, these grid circuit losses are reduced to a large extent on account of the square-topped wave excitation of the grids; and this reduction in input losses, together with the improvement in the plate efficiency of the tube, enables a larger output with the same losses to be obtained from a conventional triode in the circuit organization of this invention than in the class C oscillator.

Although the orgaization of this invention may be advantageously used in connection with conventional power triodes, it is preferred to employ a type of tube, conveniently termed a magnatriode, which is capable of providing large anode currents at relatively low anode voltages by applying the appropriate positive grid potentials, without any grid circuit losses. This type of magnatriode is disclosed in the prior application of James H. Burnett, Ser. No. 647,007, February 12, 1946, now Patent No. 2,543,739; and no claim is made herein to the general structural features and operating characteristics of such tube. However, it is expedient to outline briefly the structural characteristics of such a magnatriode tube to make clear how it functions to advantage in the circuit organization of this invention.

Figure 4:
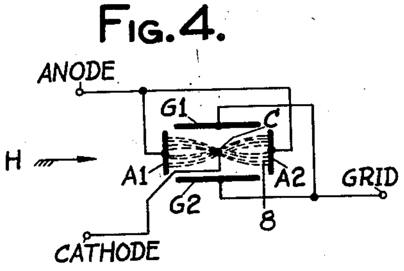
Fig. 4 is a simplified and diagrammatic representation in the form of a sectional view of a so-called magnatriode type of tube preferably employed in the circuit organizations of this invention.

This magnatriode type of tube is diagrammatically shown in Fig. 4, and in general comprises a thermionic emissive cathode C of a suitable type in an elongated or filamentary form. The anode comprises two flat plates A1, A2 located in parallel relation on opposite sides of the cathode C. Two grid bars G1, G2 are located on opposite sides of the cathode C in planes substantially at right angles to the planes of the anodes. These tube elements are disposed in a strong steady magnetic field, which has its lines of force, indicated by the arrow H, acting substantially at right angles to the anodes A1 and A2, and substantially parallel with the faces of the grid bars G1, G2. Fig. 4 may be said to be a cross section of such a tube assembly, and the cathode C, anodes A1 and A2, and grids G1 and G2 may be extended for such length as is suitable to be included in the magnetic field provided by a permanent magnet, or current carrying coil.

In this magnatriode type of tube of Fig. 4, the effect of the cross-magnetizing magnetic field in the direction indicated by the arrow H may be said to converge or focus the electrons leaving the cathode C into two streams or beams, as indicated by the dotted lines 8, which are directed toward the anodes A1, A2 and pass between the grids G1 and G2. Accordingly, even though the grids G1 and G2 have a relatively high positive potential with respect to the cathode C, no electrons reach a grid, assuming of course that the magnetic field has an appropriate strength with respect to the spacing of elements and voltages involved. In other words, the cross-magnetizing action of the magnetic field eliminates grid current at relatively high positive potentials on the grid bars, where relatively high grid currents would exist in the conventional type of triode. The potentials on the grids G1 and G2 may be said to control the space charge and govern the anode current, in much the same way as the usual grid interposed between the cathode and the anodes. Assuming an appropriate strength of magnetic field and spacing of elements, a tube of this type may be organized so that negative potentials on the grids G1 and G2 will serve to reduce and ultimately cut off the anode current, while positive potentials act to increase the anode current by neutralizing the effect of the space charge, and also by drawing more electrons from the cathode.

It can be seen that this magnatriode type of tube represents a desirable element for the combination of this invention, since substantial anode currents may be obtained at low anode voltages with this type of tube by applying the appropriate positive potential to the grid bars, and yet such positive grid potentials are not accompanied by the flow of grid current and substantial grid circuit losses, nor require special means to provide the necessary driving power for the grid. It may be added that the negative cutoff voltage for the magnatriode type of tube is ordinarily large as compared with the positive potential required for the desired anode current at low anode voltage, as indicated in Fig. 3C.

Figure 2:
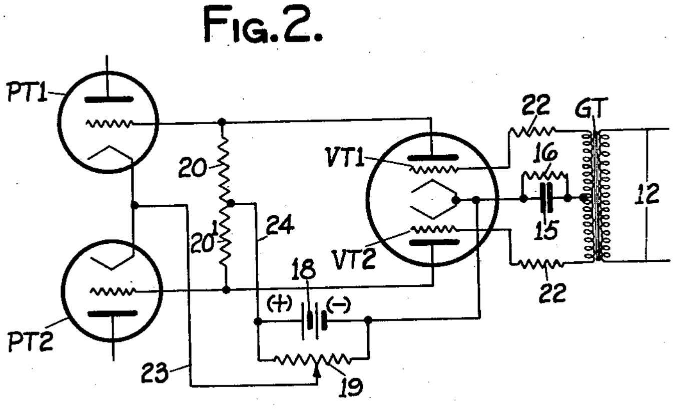
Fig. 2 illustrates one type of grid control means suitable for providing the essentially square-wave excitation for the grids of the power tubes of the circuit organization shown in Fig. 1.

One arrangement of a grid control means GC for providing the desired abruptly changing or essentially square wave grid control voltages for the power tubes PT1 and PT2 in accordance with this invention, is illustrated in Fig. 2, and comprises a twin triode of the vacuum tube type having the appropriate operating characteristics, conveniently considered as two tubes VT1 and VT2. The grids of these tubes VT1 and VT2 are connected to the opposite terminals of the two opposing secondaries of a grid transformer GT, which as shown for the oscillator arrangement assumed has its primary connected by wires 12 through a suitable phase shifting device PS to a secondary 13 of the output transformer T. The purpose of the phase shifter PS, if used, will be considered later. The center tap of the secondary of the grid transformer GT is connected through a grid condenser 15 and a grid leak resistor 16 to the cathodes of the tubes VT1 and VT2, with or without a source of an additional fixed grid biasing voltage, as desired. The alternating voltages applied to the grids of the tubes VT1 and VT2 in the desired phase relation to the voltages in the primaries P1 and P2 of the output transformer T, are relatively high, and the amplitude of these voltages is chosen, with due regard to the operating characteristics of the tubes VT1 and VT2, so that the potentials on the grids of these tubes swing between the conditions of cutoff and substantial conduction in a short time as the sine wave of the grid control voltage passes through zero. The positive potentials on the grids are limited by the flow of grid current through grid resistors 22.

In this arrangement shown in Fig. 2, the power tubes PT1 and PT2 are provided with a suitable source of positive potential tending to render these tubes conductive. As shown, a battery 18, together with an adjustable resistor 19 to constitute a potentiometer, serves to provide plate voltage for the tubes VT1 and VT2 and also the normal positive voltage for the grids of the power tubes PT1 and PT2 in series with resistors 20 and 20¹ of high resistance, as can be readily understood from the drawings.

Assuming a steady state condition where the grid capacitor 15 and grid leak resistor 16 have established a negative bias beyond cutoff for the grids of the tubes VT1 and VT2, and considering the time period when the tube VT1, for example, is thus cutoff, the potential on the grid of the associated power tube PT1 is positive by reason of circuit connections which may be traced from the cathode of this tube, wire 23, left-hand portion of the resistor 19, wire 24, and resistor 20 to the grid of tube PT1. When the voltage applied to the primary of the grid transformer GT passes through zero at the end of a half-cycle of the output voltage, corresponding with the time *t1* in Figs. 3A to 3D, the potential on the grid of tube VT1 is quickly shifted from cutoff to a value for conduction, and current flows in the plate circuit of this tube through the resistor 20, thereby reducing the potential on the grid of power tube PT1 to the desired negative cutoff value due to the voltage drop in this resistor. At the same time the grid potential on the other grid control tube VT2 is quickly swung negative beyond cutoff to stop conduction through this tube and the other resistor 20¹ to allow the grid of its associated power tube PT2 to assume its normal positive potential provided by the voltage drop in the left-hand portion of the resistor 19.

Thus, it can be seen that, by the appropriate selection of values of voltages and resistances in this arrangement, the normal positive bias on one power tube PT1 may be quickly shifted to a negative potential beyond the point of cutoff for this tube to stop conduction through it, while the normal positive bias on the other tube PT2 is concurrently rendered effective to make that tube conductive. By proper choice of the biasing voltage for the grid control tubes VT1 and VT2, each of the power tubes PT1 and PT2 may be controlled to start conduction slightly before the other power tube is cut off. In other words, the negative bias on the grids of the tubes VT1 and VT2, established by the grid capacitor 15 and grid leak resistor 16, together with any additional fixed bias voltage that may be used, may be selected so that the sinusoidal voltages in the secondaries of the grid transformer GT cause the tubes VT1 and VT2 to be conductive and stop conduction through the power tubes PT1 and PT2 for a time somewhat less than 180°, as indicated in Fig. 3C, so that as conduction is started and cut off through the power tubes PT1 and PT2 alternately, each tube is not cut off until the other tube can act to conduct current for the inductor L.

This type of grid control means GC shown in Fig. 2 renders the oscillator of Fig. 1 self-starting, due to the inherent inequalities or unbalanced conditions of the circuit elements. When the oscillator is not in operation, and the grid transformer GT is deenergized, the existing potential on the grids of the tubes VT1 and VT2 is such that both of the power tubes PT1 and PT2 are conductive. If the direct current power is applied under these conditions, current starts to build up simultaneously in both primaries P1 and P2 of the output transformer; but on account of the unbalance in these primaries P1 and P2 ordinarily existing, which may be deliberately exaggerated if desired, there will be a sufficient flux change in the core of the output transformer T to induce a voltage in its secondary 13 to act through the grid transformer GT to cause an appreciable change in the potentials of the grids of the tubes VT1 and VT2, sufficient to initiate an oscillation, whereupon the voltages and currents rapidly build up to the steady state condition. This self-starting feature, and the action of the grid capacitor and resistor combination in providing a negative grid bias voltage, involve the same principles and mode of operation involved in conventional vacuum tube oscillators, and further explanation seems unnecessary.

In the embodiment of the invention shown in Fig. 1 for an oscillator, it is assumed that the grid control means GC, such as disclosed in Fig. 2 for example, is excited from the output circuit; but this grid control means GC may be excited from any suitable source of a periodic voltage of a fixed or variable frequency. For example, the circuit including wires 12 for the primary of the grid transformer GT in Fig. 2 may be connected to any suitable source of alternating current, of a fixed or controllable frequency, with or without a phase shifting means PS. Also, it has been assumed in describing the invention as applied to an oscillator organization shown in Fig. 1, that the power tubes PT1 and PT2 deliver current to a resonant tank circuit; but the circuit organization of this invention may be used to supply blocks of current, such as indicated in Fig. 3D, to any load or output circuit, as conditions may make expedient.

Figure 5:
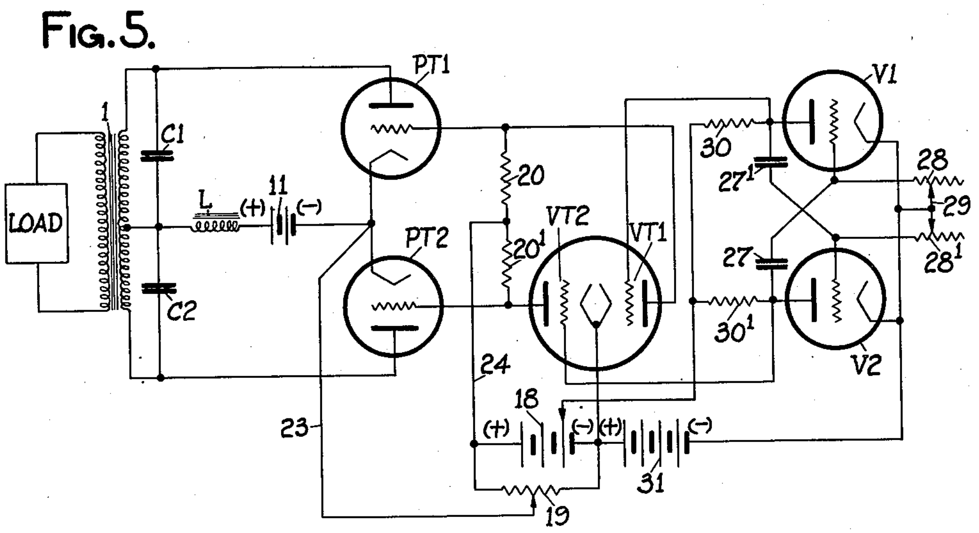
Fig. 5 illustrates a modified embodiment of the invention for converting direct current into an alternating current of a controllable frequency and employing a modified type of grid control means in the form of a multi-vibrator.

As illustrative of one modification or adaptation of the invention along these lines, Fig. 5 shows the power tubes PT1 and PT2 controlled by a grid control means GC involving a multi-vibrator, and acting to supply pulses of current of a controllable frequency to any suitable load, such as a motor or the like, such load being shown schematically in block form. In this arrangement of Fig. 5, the grids of the tubes VT1 and VT2, which determine the grid potentials for the power tubes PT1 and PT2 in the same way as shown in Fig. 2, are connected to the anodes of vacuum tubes V1 and V2 of a typical multi-vibrator circuit organization. As shown, the grids of the tubes V1 and V2 are each connected to the anode of the other tube, through a grid capacitor 27, 27′, and to its cathode through a grid resistor 28, 28′ adjustable by a common contactor 29. The anode circuits for the multi-vibrator tubes V1 and V2 include load resistors 30, 30′ and a battery 31, together with an adjustable portion of the battery 18, as can be readily understood from the drawings.

This multi-vibrator organization of Fig. 5 acts in the usual way to provide abrupt changes in the anode currents for the multi-vibrator tubes V1 and V2, and in turn abrupt changes in the potentials on the grids of the tubes VT1 and VT2 to determine the periods of conduction and cutoff for the power tubes PT1 and PT2. Briefly outlining this operation, and considering the time when the multi-vibrator tube V1, for example, is not conducting, there is no current through its load resistor 30, nor voltage drop in this resistor, and the grid of the tube VT1 has applied thereto a positive potential corresponding with the voltage of the portion of the battery 18 cut in by the existing adjustment. Thus, the tube VT1 at the instant under consideration is conducting, and the voltage drop in the resistor 20 makes the grid of the power tube PT1 sufficiently negative to stop conduction through this tube. At this time under consideration, while the multi-vibrator tube V1 is not conducting, the other tube is conducting, and the voltage drop in its load resistor 30′ makes the grid of the tube VT2 sufficiently negative to stop conduction through this tube and flow of current through the associated resistor 20′, so that the grid of the power tube PT2 assumes its normal positive bias potential to become conductive. When the charge on the condenser 27 maintaining the grid of the multi-vibrator tube V1 biased beyond cutoff has leaked away through the resistor 28, this tube V1 starts to conduct, and as its anode current increases, the grid for the other multi-vibrator tube V2 is made more negative. Thus, in the manner characteristic of the multi-vibrator action, the anode current for tube V1 abruptly attains its maximum value while the anode current through the other tube V2 is cut off. This quickly reverses the potentials on the grids of the grid control tubes VT1 and VT2 to render the power tube PT1 conductive and cut off the other power tube PT2. The same action is repeated as the charge on the other capacitor 27′ for the grid of the tube V2 leaks off.

Figure 6:
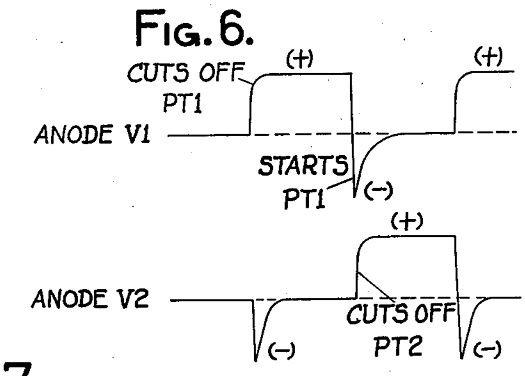
Fig. 6 shows typical voltage curves characteristic of the multi-vibrator of Fig. 5.

The curves indicating the changes in anode voltages for a typical multi-vibrator organization are illustrated in Fig. 6; and it can be seen that by appropriate selection of the values for the curcuit elements, each of the power tubes PT1 and PT2 may be rendered conductive before conduction through the other tube is cut off, thereby providing a circuit for current through the inductor L for the purpose and reasons previously explained.

The multi-vibrator of the grid control means GC shown in Fig. 5 is ordinarily adjusted to be symmetrical and provide square-wave excitation of the grids of the power tubes PT1 and PT2 at equal periods at a predetermined frequency. This frequency is determined by the values of the grid capacitors 27, 27′ and the grid resistors 28, 28′ and may be varied, if desired, by changing the values of these resistors alike by the contact 29 as shown, or by varying the capacity of the grid capacitors 27, 27′ by any one of the well known expedients. It will be readily appreciated that various adaptations and modifications may be made in the particular arrangement of circuits shown in Fig. 5 for employing a multi-vibrator as a grid control means, and that any other suitable form of square-wave generator may be employed.

Figure 7:
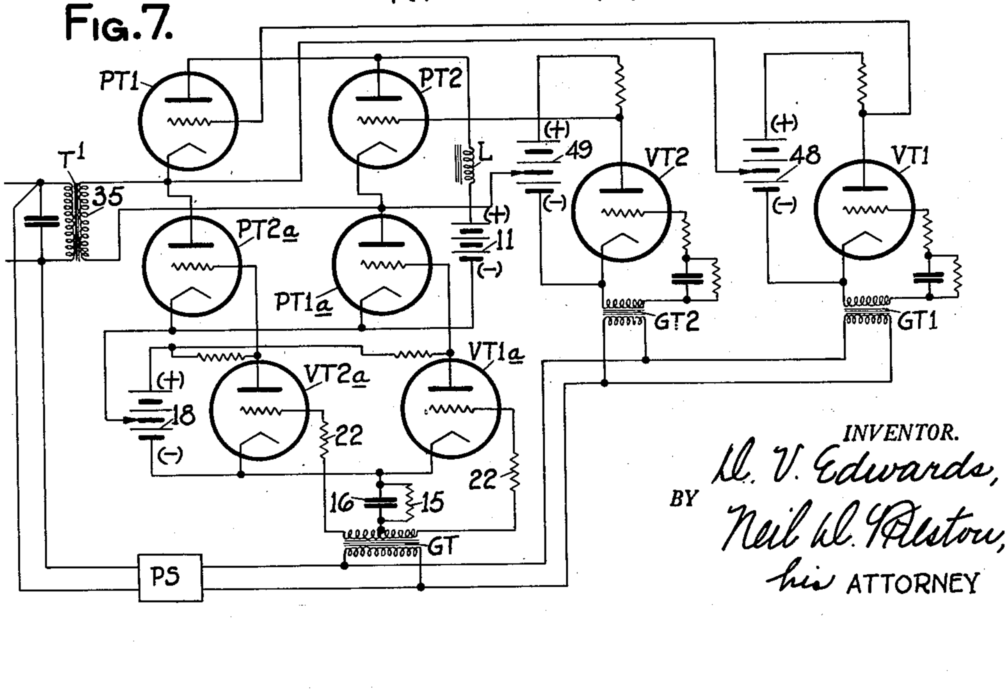
Fig. 7 illustrates another modified embodiment of the invention employing a bridge circuit for the power tubes instead of the center-tapped transformer arrangement shown in Fig. 1.

From the foregoing explanation, it can be seen that the use of a large inductance L in combination with essentially square-wave excitation of the grids of two power tubes requires some circuit organization, such as the push-pull arrangement shown in Fig. 1, to provide the desired reversal in polarity for the output of the power tubes. A push-pull arrangement, including a center-tapped transformer winding, is typical or illustrative of a circuit organization suitable for this purpose; but various other circuit organizations capable of performing the same functions may be employed. As illustrative of such a modification, Fig. 7 illustrates an embodiment of the invention involving four power tubes in a bridge arrangement. The grids of one pair of tubes PT1 and PT1a are controlled simultaneously for conduction and cutoff, and when these power tubes are conductive, current may flow from the battery 11 through the inductor L through the tube PT1 and primary 35 of the output transformer $T^1$ in one direction through the other power tube PT1a back to the battery 11. The grids of the other pair of power tubes PT2 and PT2a are similarly controlled together; and when these tubes are conducting, current will flow from the battery 11 through the inductor L, power tube PT2, through the primary 35 of the power transformer $T^1$ in the opposite direction, and through tube PT2a back to the battery.

In this bridge arrangement of Fig. 7, the cathodes of two of the power tubes PT2a and PT1a are connected together and are at the same potential, so that the grids of these tubes may be controlled by grid control tubes VT2a and VT1a and a grid transformer GT in the same manner as shown in Fig. 2. The cathodes of the other power tubes PT1 and PT2, however, are connected to different terminals of the single primary of the output transformer $T^1$ and are at radically different potentials. Consequently these power tubes PT1 and PT2 require isolated grid control voltages which will provide the appropriate grid potentials relative to their respective cathodes. As shown, separate grid control transformers GT1 and GT2 and separate batteries 48 and 49 are used for the grid control tubes VT1 and VT2 governing the grids of the power tubes PT1 and PT2, in a manner that can be readily understood from the drawings.

The general mode of operation of this bridge arrangement shown in Fig. 7 is the same as previously explained for the oscillator organization of Fig. 1 and grid control means of Fig. 2. In this bridge arrangement of Fig. 7, the current pulses, such as indicated in Fig. 3D, flow in opposite directions alternately in the single primary 35 of the output transformer $T^1$, rather than through the separate primaries P1 and P2 in the organization of Fig. 1, so that the size and losses of transformer $T^1$ are reduced. Also, the circuits for these current pulses include two power tubes in series, such as the tubes PT1 and PT1a; and hence the voltages in these circuits may be much higher for tubes of the same voltage rating than in the arrangement of Fig. 1. These and other distinctions between the center-tapped transformer arrangement of Fig. 1 and the bridge arrangement of Fig. 7 are typical of the factors to be considered in adopting some one of the various types of rectifier circuit organizations in practicing this invention, which has certain distinctive principles and mode of operation which are not limited to any one specific form of rectifier circuit organization.

Figure 8:
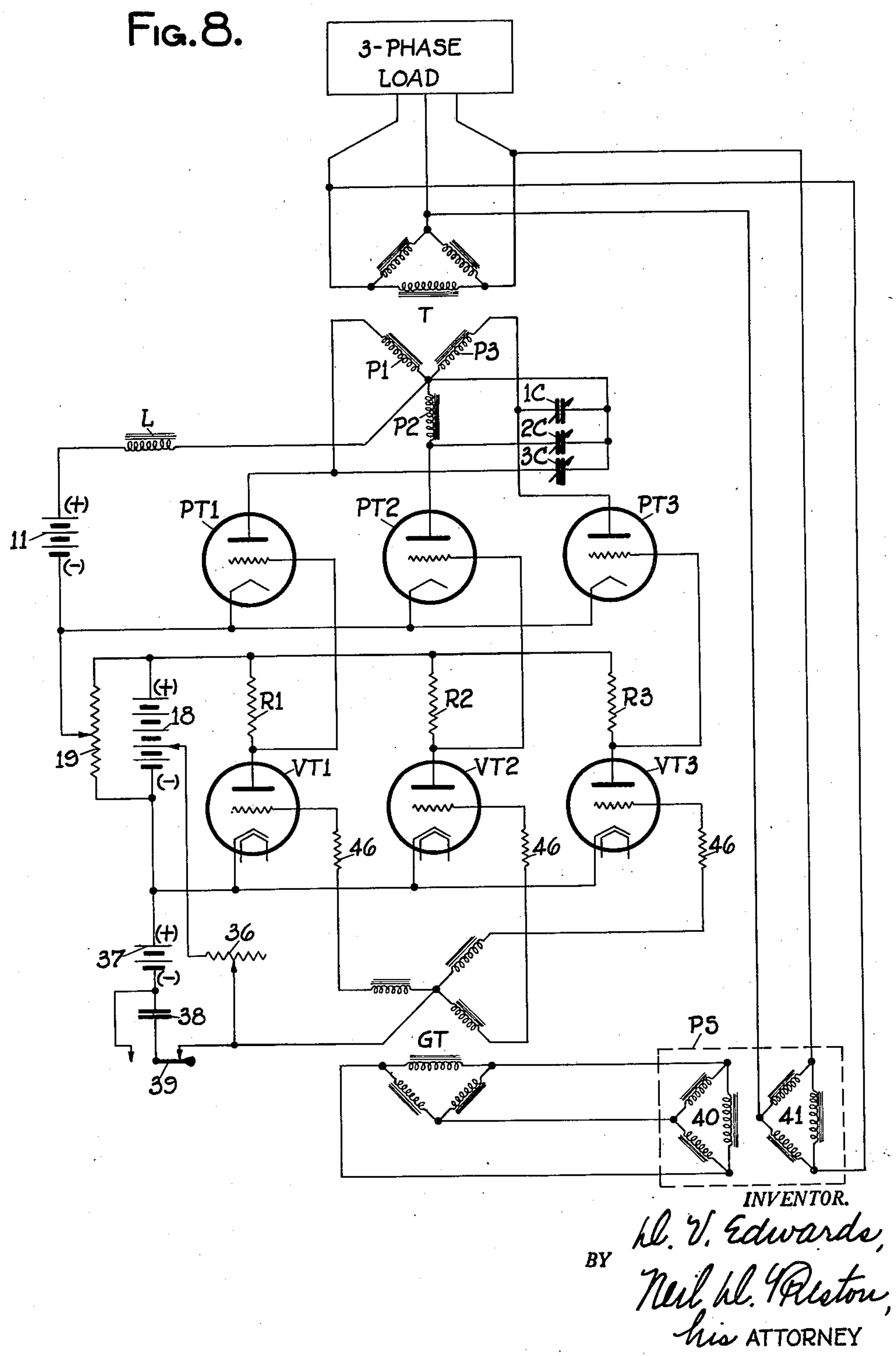
Fig. 8 is another embodiment of the invention for polyphase operation, specifically in the form of an oscillator or inverter for providing speed control for three-phase induction motors.

For certain applications of the invention it may be desirable to provide polyphase alternating currents, as for example in connection with supplying power of a fixed or controllable frequency to a three-phase load, such as an induction motor or the like. A typical example of such a polyphase circuit organization is shown in Fig. 8. The anodes of three power tubes PT1, PT2 and PT3 are connected to the terminals of Y-connected primaries P1, P2 and P3 of a three-phase output transformer T; and the secondaries of this transformer T, shown delta-connected, are connected to a three-phase induction motor or similar polyphase load shown schematically in block form. The neutral of the primaries for the output transformer T is connected to an inductor L and a direct current power source, shown as a battery 11.

It is contemplated that the primaries P1, P2 and P3 may, if desired, be tuned to a desired operating frequency for the load, such as in the case of a three-phase induction motor, by capacitors 1C, 2C and 3C arranged to be adjusted together by suitable means, with or without taps on these primary windings as best adapted to the particular situation. Under some situations, and for certain types of polyphase loads, such frequency control may be unnecessary, and the capacitors 1C, 2C and 3C are not employed to provide a resonant tank circuit, but have a capacity suitable for absorbing the peak voltage generated by the leakage reactance of the primary windings when conduction through the associated power tube is cut off, the same as previously explained for the capacitors C1 and C2 in Fig. 1.

In the circuit organization as shown in Fig. 8, the grids of the power tubes PT1, PT2 and PT3 are provided with a normal positive voltage by the battery 18 and resistance 19, and this positive potential is quickly shifted to a negative value beyond the cutoff voltage for these power tubes by the voltage drop in the load resistors R1, R2 and R3 of the grid control tubes VT1, VT2 and VT3, as these respective tubes become conductive, in substantially the same manner as previously explained.

The grids of the control tubes VT1, VT2 and VT3 are connected through a suitable grid resistance 46 to the terminals of Y-connected secondaries of the grid transformer GT; and the neutrals of these secondaries are connected to the cathodes of these tubes with associated means for providing the desired biasing voltages for starting and steady state conditions.

The primaries of the grid transformer GT are connected through a phase shifter PS to the output circuits, as can be readily understood from the drawings. The phase shifter PS as shown is assumed to be of the type, sometimes termed a Syncro, which in general comprises a three-phase wound rotor, indicated at 40, which may be manually or automatically turned to different positions with respect to a three-phase stator, indicated at 41, so as to change the phase relation of the voltage induced in the windings of this rotor 40 with respect to the voltages in the windings of the stator 41, in the usual and well known manner.

In the three-phase arrangement under consideration, it is desirable that the conduction periods for the power tubes PT1, PT2 and PT3 should be slightly more than 120°; and this makes it desirable to provide a positive biasing voltage for the grids of the control tubes VT1, VT2 and VT3. In the arrangement shown, the lower portion of the battery 18 in series with a resistor 36 of relatively high resistance, preferably adjustable as indicated, provides a positive biasing voltage for the grids of the control tubes VT1, VT2 and VT3. Referring to the curves in Fig. 9D, this positive biasing voltage raises the axis of the alternating current voltage in the secondary of the transformer GT for the tube VT1, for example, so that this voltage current intersects the line of cut-off voltage for this tube at points indicated at 44 and 45 to correspond with a conduction period of slightly more than 120°, say 122°, for the associated power tube PT1. The grid resistor 36 limits the positive potential on the grid of the control tube VT1 as grid current flows, as indicated by the dash line. This provides the desired conduction periods for the power tubes PT1, PT2 and PT3 for steady state conditions.

Figures 9A, 9B, 9C, 9D:
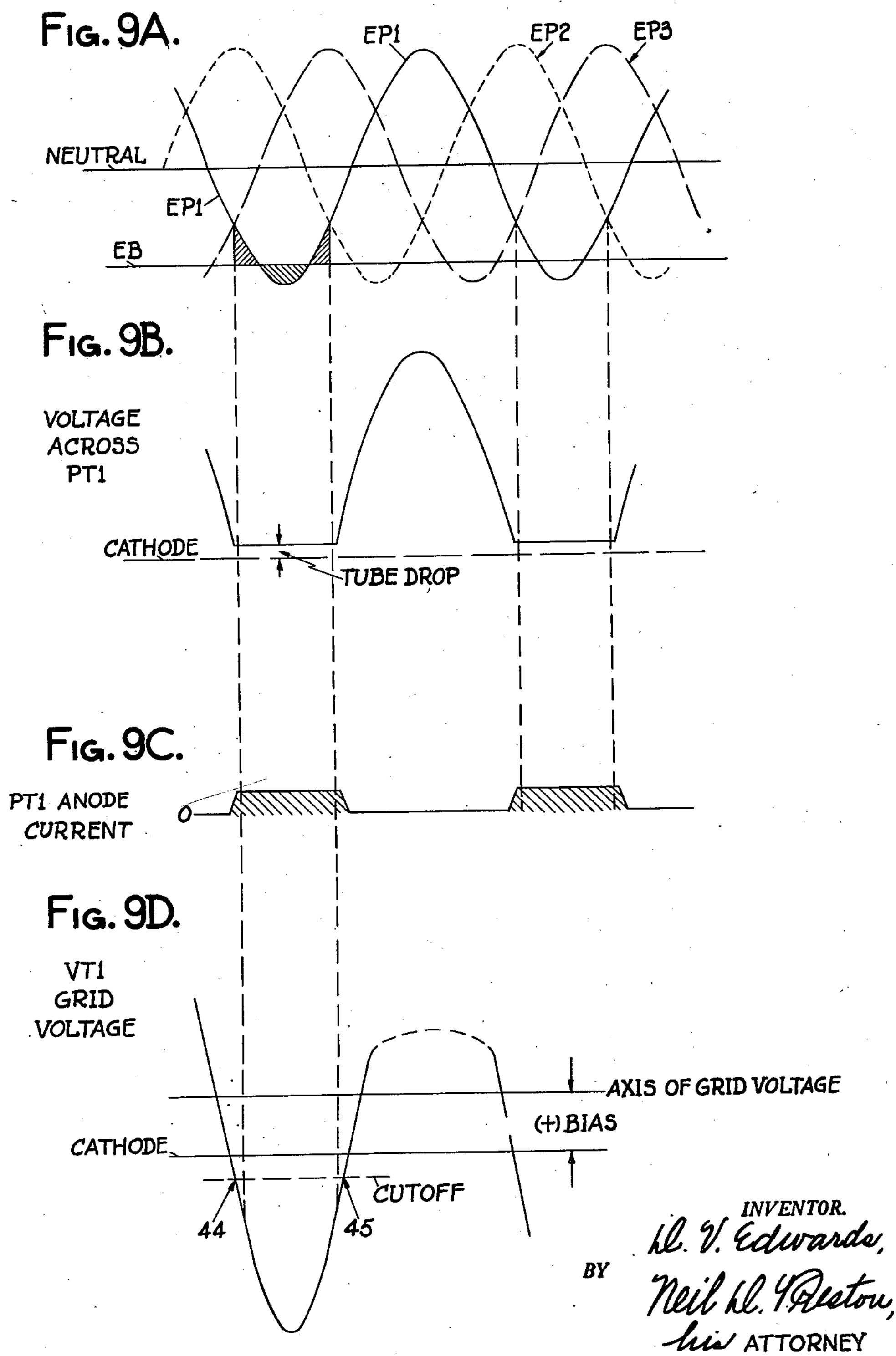
Figs. 9A to 9D show schematically a group of typical voltage and current curves or graphs characteristic of the circuit organization of Fig. 8.

Considering the power tube PT1, for example, when conduction through the control tube VT1 is cut off by its grid control voltage at the point 44 indicated in Fig. 9D, the flow of current through its load resistor R1 ceases, and the grid of this power tube PT1 quickly assumes the positive potential provided by the lower portion of the potentiometer arrangement of the battery 18 and resistor 19, so that the tube PT1 becomes fully conductive in accordance with the fixed positive potential thus provided throughout the desired conduction period. After the power tube PT1 has thus conducted for slightly more than the 120° of the phase angle for this tube, the grid control voltage for the associated control tube VT1 rises above cutoff, as indicated at 45 in Fig. 9D, and this tube VT1 becomes conductive to provide a voltage drop in its load resistor R1 which swings the grid of the power tube PT1 abruptly negative beyond cutoff and stops conduction through this power tube. In this connection, the voltages of the secondaries of the grid transformer GT are relatively high so as to have rapidly changing values at the time the control tubes VT1, VT2 and VT3 are changed from cutoff to conduction, so as to swing the grid potentials of the associated power tubes PT1 and PT2 quickly between cutoff and full conduction. The actual positive potential on the grid of tube VT1, for example, is limited by the flow of grid current through its grid resistor 46, as generally indicated by dash lines in Fig. 9D, in spite of positive value of the applied sinusoidal grid voltage.

The general mode of the circuit organization illustrated in Fig. 8 is the same as that previously described, except that three-phase voltages and conduction periods of approximately 120° are involved. Figs. 9A to 9D illustrate for explanatory purposes curves of the primary phase voltages EP1, EP2 and EP3 together with the voltage across one of the power tubes PT1, the anode current for this tube, and the grid voltage for the associated grid control tube VT1. In order to avoid confusion, only those currents and voltages relating to one power tube PT1 have been shown in Figs. 9B to 9D; and it should be understood that similar voltage and current changes are occurring with respect to the other two power tubes PT2 and PT3 at the time in the complete cycle corresponding with their phase voltages.

Briefly outlining the mode of operation for the circuit arrangement of Fig. 8, and assuming a steady state condition with the phase shifter PS set for the in-phase position for unity power factor in the output circuit, the conduction period for the power tube PT1 is determined by the control of the grid of the associated tube VT1. When the grid potential of the grid control tube VT1 is swung negative beyond cutoff, and conduction through this tube VT1 ceases, as indicated at 44 in Fig. 9D, there is no voltage drop in its load resistor R1, and the grid of the power tube PT1 assumes the positive potential provided by the voltage drop in the portion of the resistor 19 cut in. The power tube PT1 continues to conduct until the grid of the tube VT1 is made more positive than cutoff, as indicated at 45 in Fig. 9D, and anode current flows through the load resistor R1 of this tube to swing the grid of the power tube PT1 negative beyond cutoff.

During this conduction period of the power tube PT1, the inductor L acts in the same manner previously explained to maintain the essentially uniform tube drop and anode current for this tube, as indicated in Figs. 9B and 9C, in spite of the sinusoidal variation of the voltage EP1 existing in the associated primary P1 during this conduction period. In this connection it may be considered that the voltage across the inductor L adjusts itself so that the cross-hatched areas shown in Fig. 9A above and below the line EB for the voltage of the battery 11, are equal, disregarding losses in this inductor L.

The other power tubes PT2 and PT3 act in a similar manner to supply blocks of current to their associated primaries P2 and P3 during other approximate 120° periods of the cycle, so that three-phase voltages of the selected frequency are induced in the secondaries of the output transformer to supply power to the load.

As previously noted, it is important in this invention that conduction through each power tube, such as the tube PT1, should be started before conduction is cut off through the power tube for the next preceding phase, so that there will be a circuit for current from the relatively large inductance L through some tube at all times. Accordingly, the positive biasing potential for the grid of the tube VT1, for example, is chosen or adjusted so that the voltage in the secondary of the grid transformer GT becomes more positive than the negative cutoff voltage for this tube VT1 for slightly more than the regular 120° conduction period of the power tube PT1, say 122°, as approximately indicated in Figs. 9B to 9C.

When a positive biasing voltage is used for the grids of the control tubes VT1, VT2 and VT3 to obtain the desired conduction periods of approximately 120°, the tendency of these control tubes VT1, VT2 and VT3 is to be conductive and render the associated power tubes PT1, PT2 and PT3 non-conductive; and since this condition exists when the circuit organization is not in operation, it is necessary to make special provisions for eliminating this positive biasing voltage temporarily and permit conduction through the power tubes to start up the oscillator. In the arrangement shown, the positive biasing voltage for the grids of the control tubes VT1, VT2 and VT3 is obtained from a portion of the battery 18 acting through a resistor 36 to maintain the neutral of the secondaries of the grid transformer GT positive wtih respect to the cathodes of the tubes VT1, VT2 and VT3. Another battery 37, or equivalent source of negative bias, is employed for the grids of the control tubes VT1, VT2 and VT3, in connection with a capacitor 38 and a suitable starting switch 39.

When the oscillator is shut down, the starting switch 39 is put in the left-hand position and the capacitor 38 is discharged. The lower portion of the battery 18 provides a positive bias to render all of the control tubes VT1, VT2 and VT3 conductive, in turn making the grids of the associated power tubes PT1, PT2 and PT3 negative beyond cutoff; and no current will flow if the main source of direct current voltage from the battery 11 is applied.

Assuming that it is desired to start the oscillator into operation, the starting switch 39 is shifted to its right-hand position to connect the battery 37 in series with the capacitor 38 into the grid circuits for the control tubes VT1, VT2 and VT3. This changes the potential of the neutral of the secondary of the grid transformer GT from positive to negative sufficiently to reduce conduction through the control tubes VT1, VT2 and VT3 to a point where their associated power tubes PT1, PT2 and PT3 are at least partially conductive. Under these conditions, current from the battery 11 is supplied simultaneously through the power tubes PT1, PT2 and PT3 to all of the primaries P1, P2 and P3 of the transformer T; but the inherent unbalanced condition of the circuits, which may be exaggerated if desired, results in a greater flux change with respect to one of these primaries P1, P2 or P3 than the others, and gives a resultant voltage in one of the secondaries of the grid transformer GT. This variation in the grid transformer voltage in turn varies the relative grid potentials of the control tubes VT1, VT2 and VT3 to affect the relative conductivity of the power tubes PT1, PT2 and PT3, thereby initiating oscillations under conditions similar to those existing in a class A amplifier. As these oscillations build up, the voltages of the grid transformer GT obtain values suitable for the steady state condition.

During the very short time required for initiating and building up oscillations in this way, the capacitor 38 is being charged through the resistor 36 by the battery 37 in series with the lower portion of the battery 18; and by the appropriate selection of the value of the resistance 36 with relation to the capacity of the capacitor 38, the time required for this capacitor to become fully charged may be made sufficient for initiating and building up oscillations. When the capacitor 38 becomes fully charged, and the voltage across it corresponds with the combined voltages of the battery 37 and the lower portion of the battery 18, the neutral of the secondaries of the grid transformer GT assumes a positive potential with respect to the cathodes of the control tubes VT1, VT2 and VT3, corresponding with the portion of the battery 18 included in the circuit, so that the desired positive biasing voltage for steady state conditions is established, and the desired conduction periods of approximately 120° are provided.

In other words, in the three phase arrangement illustrated in Fig. 8, the oscillator starts as class A during a short time interval required for the capacitor 38 to become fully charged, whereupon operation is continued under the steady state conditions as described with the desired fixed positive bias for the grids of the control tubes VT1, VT2 and VT3 suitable for giving the desired conduction periods of slightly more than 120°.

From the foregoing it can be seen that the circuit organization of Fig. 8 provides for the conversion of direct current to a three-phase alternating current of a selected frequency at high plate efficiency, and is well adapted for speed control of induction motors or supply of controllable power to other polyphase loads.

A phase shifting device PS, illustrated schematically in block form, has been illustrated as part of the organizations shown in Figs. 1 and 8. This device PS may be any one of the well known circuit networks involving relatively adjustable impedance elements for causing a phase shift, or a movable wound rotor cooperating with a wound stator, as in Fig. 8. Briefly stated, such a phase shifting device PS enables the conduction periods of the power tubes, such as PT1, to be advanced or retarded with respect to the alternating voltage in the transformer windings. The significance and effect of such phase shifting is conveniently considered in connection with the explanatory diagrams shown in Figs. 10A to 10F.

These diagrammatic representations in Figs. 10A to 10F include voltage curves and schematic showings of conduction periods and currents for typical cases where the phase shifting device PS is set to start and stop conduction through the power tubes PT1 and PT2 at different points in the cycle. In the interests of simplicity, these diagrams relate to the single phase organization of Fig. 1, although the same principles apply to a polyphase arrangement.

In these Figs. 10A to 10F, the first or top graph shows the primary voltages EP1 and EP2 of the output transformer T; and using the primary voltage EP1 as a reference, this graph also indicates schematically in block form the conduction periods for the power tubes PT1 and PT2, when the phase shifting device PS is adjusted to start conduction at different points in the cycle corresponding with 90°, 135°, etc. These primary voltages EP1 and EP2 are shown in solid and dash lines respectively, and the conduction periods for the tubes PT1 and PT2 are indicated in block form by solid and dash lines respectively, with a higher solid line block for the tube PT1, as a matter of convenience in order to make these quantities relating to these two tubes more distinctive. The second curve in these Figs. 10A to 10F shows the voltage E1 across the tube PT1 for the different conduction periods, this voltage having the relatively low and substantially uniform value during the conduction period, as previously discussed. The third graph indicates schematically as shaded areas of alternating voltage EP1 the transfer of energy or power to or from the primary P1 of the output transformer during the conduction period of the tube PT1, as such conduction is initiated or cut off at different points in the cycle.

Figure 10A:
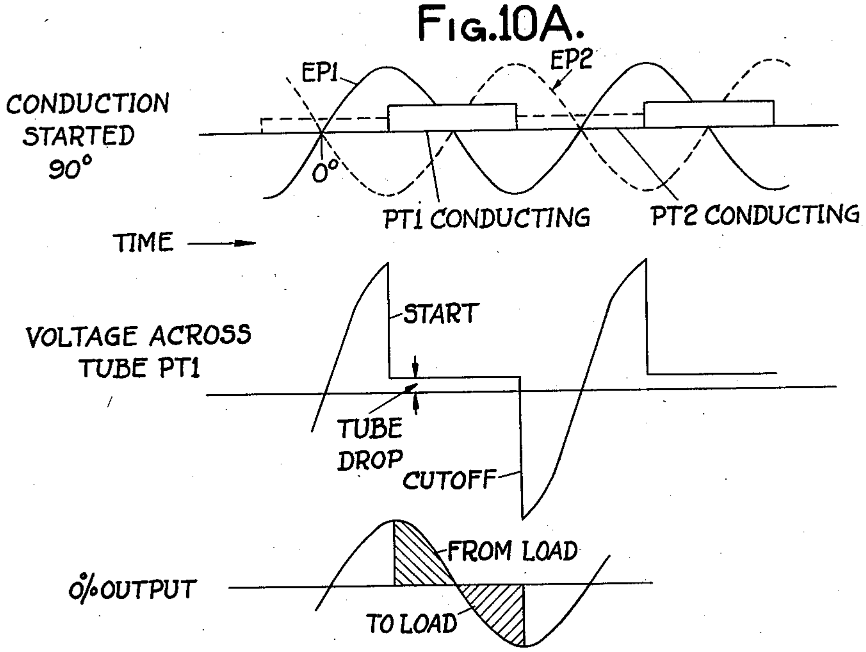
Figs. 10A to 10F illustrate for explanatory purposes a series of schematic diagrams or graphs showing the effect of changing the time of the conduction periods through the power tubes with respect to the alternating voltage by varying the phase of the grid control voltage of these power tubes.

Considering the condition indicated in Fig. 10A, where the phase shifting device PS is assumed to have been adjusted so that conduction for the power tube PT1 is started at 90° with respect to the primary voltage EP1, it can be seen that the primary voltage EP1 is positive during the first half or 90° of the conduction period of the tube PT1, so that from the general viewpoint of energy transfer, this primary voltage EP1 is supplying current, and the transfer of energy is from this primary P1 and the load to the direct current source. On the other hand, during the second half or 90° of conduction period of the tube PT1, the primary voltage EP1 is negative, and current is being supplied to the primary P1 from the direct current source and voltage generated by the inductor L. In other words, as schematically indicated in the third graph in Fig. 10A, it may be considered that the load is supplying power during the first half of the conduction period of the tube PT1 and receiving power during the second half of this conduction period, with the result that the output power to the load is zero. Thus, if the phase shifting device PS in Fig. 1 is set to start conduction through the tube PT1 at 90° with respect to the primary voltage EP1, as indicated in the graphs of Fig. 10A, the power output would be zero.

Figure 10B:
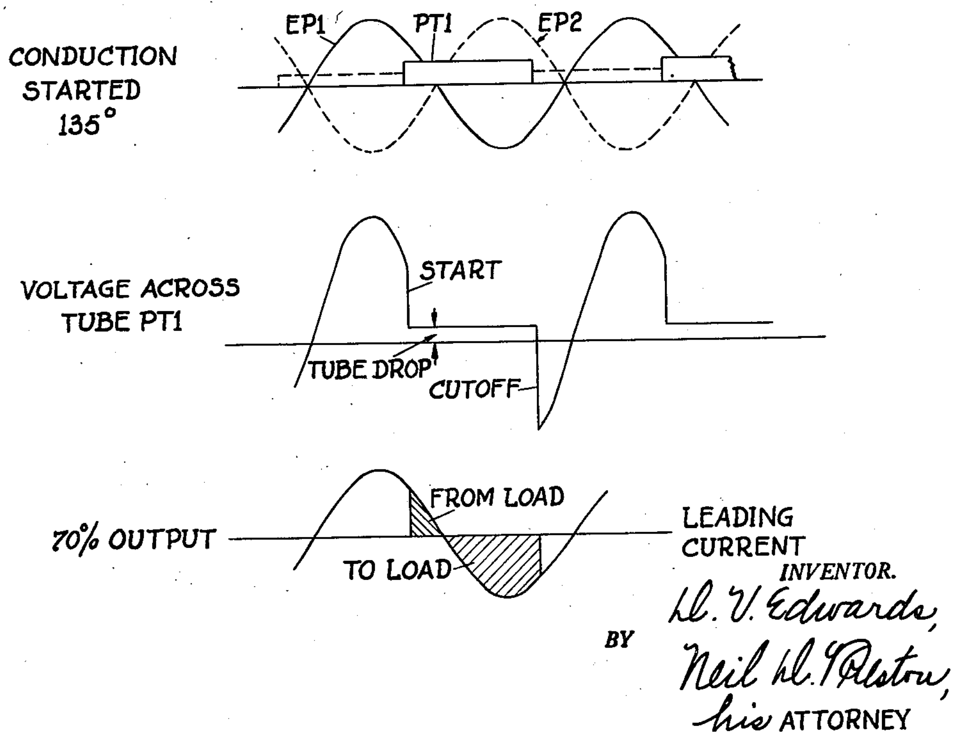

If the conduction period through the tube PT1 should be shifted to start at 135° by adjustment of the phase shifting device PS, as indicated in Fig. 10B, the primary voltage EP1 is negative during the greater part of this conduction period; and the load is receiving power for 135° and supplying power for only 45°, so that the net power supplied to the load is approximately 70 per cent of the full output. It should be noted that the block of current to the load under these conditions indicated in Fig. 10B occurs during the early part of the half cycle of primary voltage. Stated another way, the median time axis of this block current supplied to the load is earlier in point of time than the peak value of the primary voltage EP1. In short, this current in effect is leading the voltage. Thus, the phase shifting device PS may be adjusted to provide an input current leading the output voltage, which will serve to compensate for the tendency of the load to draw a lagging current, and obtain more efficient operation of the load equipment at the resultant unity power factor.

Figure 10C:
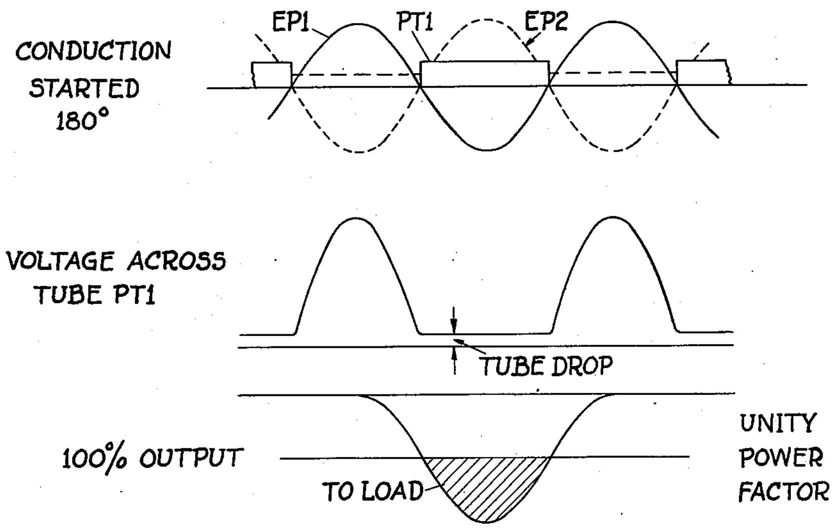

If now the period of conduction through the tube PT1 is started at 180° with respect to the primary voltage EP1, as indicated in Fig. 10C, and corresponding with the conditions assumed for the curves shown in Figs. 3A to 3D and previously explained, then the full or 100 per cent current conducted by the power tube PT1 is supplied to the load for the entire half cycle or 180° at unity power factor.

Figure 10D:
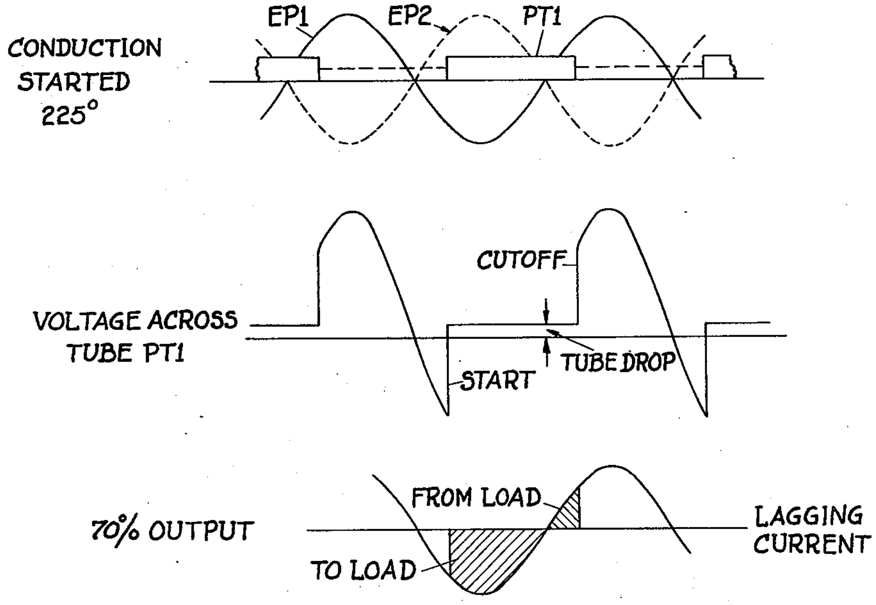

Assume now that the phase shifting device PS is adjusted so as to render the grid control tube VT1 conductive at 45° with respect to the primary voltage EP1, and thus supply a negative voltage to the grid of the power tube PT1 and cut off conduction through this tube at this time, in spite of the positive voltage on the anode of this tube provided by this primary voltage, which can be done with the vacuum tubes characteristic of this invention, but not with a gas discharge tube. These conditions are indicated in Fig. 10D. It can be seen that the conduction period for the tube PT1 may thus be started at 225° with respect to the primary voltage EP1 and continued for 180°, and then cut off. Under these conditions, as schematically indicated in this Fig. 10D, the first and greater part of the conduction period for the tube PT1 involves supply of power to the load and the smaller and latter part of this conduction period calls for transfer of power from the load, so that the effective output is 70 per cent. In this case, while the output is the same for conduction started at 135°, as indicated in Fig. 10B, it can be seen that the current to the load is lagging with respect to the output voltage, and may be used to compensate for the tendency of the load to draw a leading current.

Figure 10E:
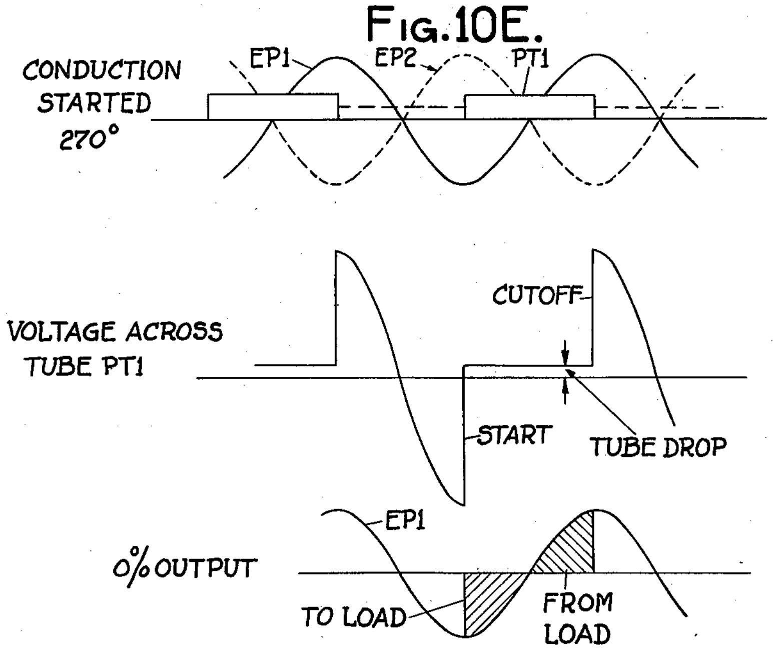

If the conduction period for the tube PT1 is retarded still further until 270° with respect to the primary voltage EP1, as shown in Fig. 10E, the conditions are similar to those shown in Fig. 10A, where the output is zero.

From consideration of these diagrams of Figs. 10A to 10D and the foregoing brief explanation, it can be appreciated that the phase shifting device PS in Fig. 1 may be used to change from the condition of zero output indicated in Fig. 10A, through a controllable range of output currents which are leading with respect to the output voltage, as indicated in Fig. 10B, to full conduction at unity power factor, as indicated in Fig. 10C, and then through a controllable range of output current which is lagging with respect to the output voltage, as indicated in Fig. 10D, until the output is again zero, as indicated in Fig. 10E. Thus, a phase shifting control in conjunction with the circuit organization of this invention enables any desired output at any desired power factor to be obtained, as the character of the load may make expedient. While this has been discussed in connection with the oscillator organization of Fig. 1, the same principles apply to the polyphase organization in Fig. 8.

Figure 10F:
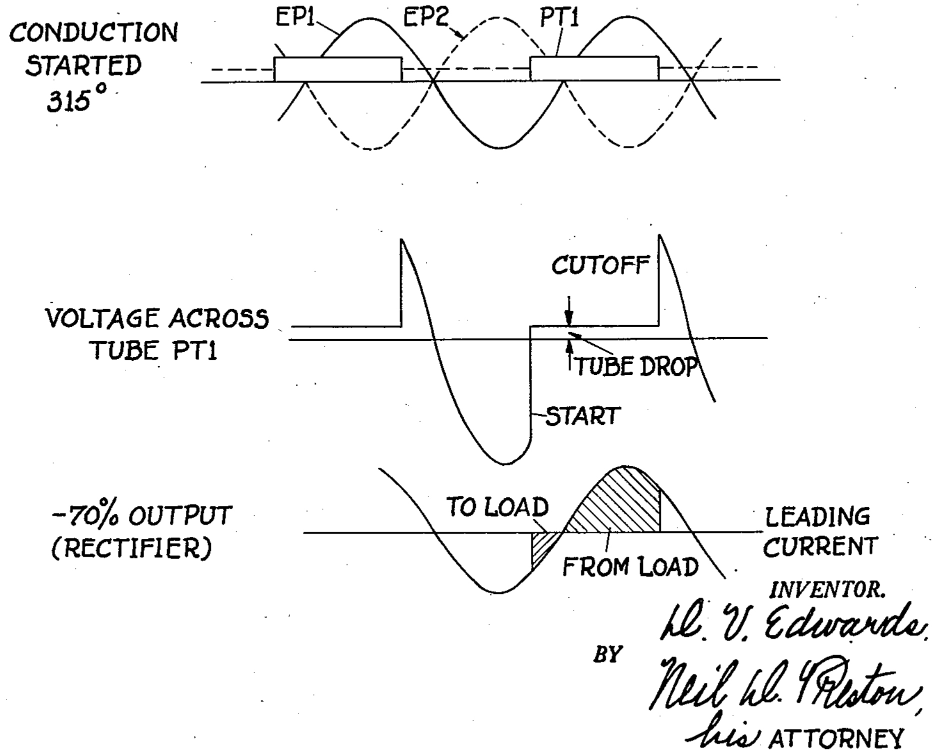

An analysis of the effect of shifting the conduction periods of the power tubes with respect to the primary voltages of the output transformer, if still carried farther, indicates how the circuit organization of this invention may be advantageously employed as a grid control rectifier, as well as an oscillator or inverter. The usual type of grid control rectifier employs gas discharge tubes; and while conduction through a discharge tube may be initiated at different points in a cycle, conduction through the tube cannot be cut off or stopped by control of its grid potential. Since the power tubes PT1 and PT2 of the circuit organization of this invention are of the hard vacuum type, either a conventional triode or the magnatriode type previously described, conduction through these tubes may be stopped or cut off, as well as started, by control of their grid potentials at any desired point in this cycle. For example, as indicated in Fig. 10F, conduction through the tube PT1 may be cut off at 135° with respect to the primary voltage EP1, and conduction through the tube PT1 may be started at 315°, near the end of the conduction through the other power tube PT2. Under these conditions, as schematically indicated in Fig. 10F, less energy is supplied to the primary P1 from the battery 11 than is to be taken from this primary P1. The circuit organization then would act as a rectifier to convert alternating current in the primaries of the output transformer to direct current through the inductance L and battery 11, or equivalent load. In other words, with adjustments of the phase shifting device such that the conduction periods, such as indicated in Fig. 10F, require the primaries of the transformer to supply more current than they receive, the circuit organization will operate as a full-wave rectifier. The amount of current supplied from the primaries of the transformer may be varied from zero, for a conduction started at 270°, as indicated in Fig. 10E, to a maximum, where conduction is started at 360° with reference to the cycle of primary voltage EP1 illustrated in Fig. 10F, or in effect at 0° for the next cycle.

The significant characteristic of the circuit organization of this invention as thus used as a full-wave grid control rectifier, is that the blocks of current supplied to the load are leading with respect to their phase voltages. For example, referring to Fig. 10F, it can be seen that block of current supplied from the primary P1 to the load (battery 11) occurs during the first part of the positive half-cycle of primary voltage EP1, so that this current in effect is leading the primary voltage. The same is true for the other tube PT2. Thus, the circuit organization of this invention may be advantageously used for a full-wave grid control rectifier giving leading currents of controllable magnitude, rather than the lagging currents characteristic of the usual grid control rectifiers employing gaseous discharge tubes. A control rectifier capable of giving leading currents may be employed to advantage in various situations where such rectifiers will act to improve the power factor of circuits supplying control rectifiers of the conventional types or other devices drawing lagging currents.

The circuit organization of this invention, when arranged to act as a rectifier to draw a leading current from the alternating current supply circuit, as just explained in connection with Fig. 10F, may be used to constitute a power factor correction device in the manner diagrammatically illustrated in Fig. 11. In this application or adaptation of the invention, it is assumed that a typical alternating current power line 51, energized by a conventional alternating current generator GEN, supplies current to some load or loads, represented schematically in block form, which may act from time to time to draw a lagging current, and that it is desired to provide means which will automatically draw an equivalent amount of leading current from the power line 51 to give an in-phase power factor load upon the power line that is desirable from the standpoint of efficient transmission and distribution of power.

Figure 11:
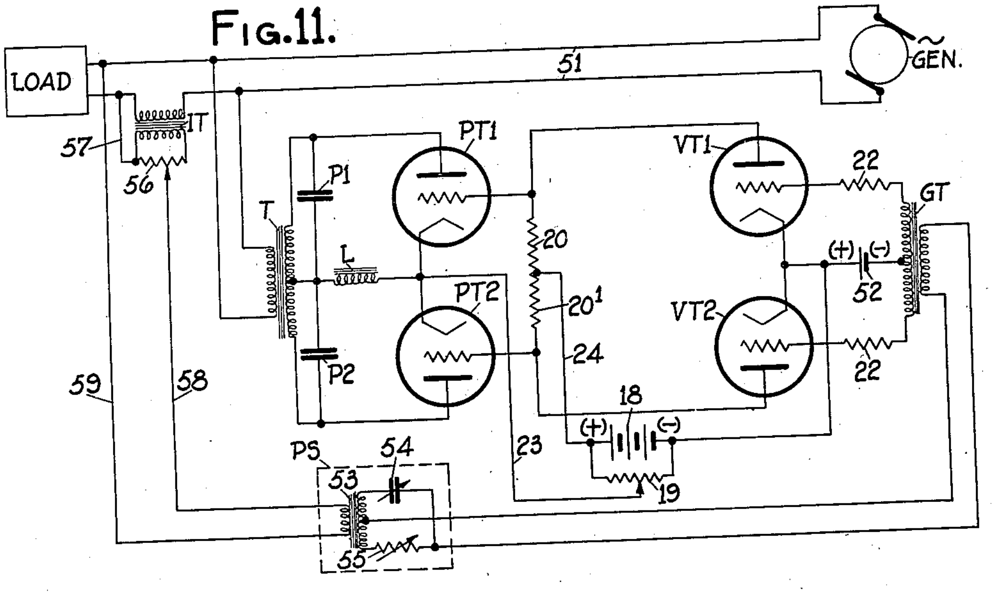
Fig. 11 shows a modified form of grid control means for the power tubes for single phase operation.

In the arrangement shown in Fig. 11, the primary of a transformer T, which has power tubes PT1 and PT2 and an inductor L associated with its secondary in the same way shown in Fig. 1 and previously discussed, but without the battery 11 of Fig. 1, is connected across the power line 51. The grids of these power tubes PT1 and PT2 are illustrated in Fig. 11 as governed by a grid control means of the type shown in Fig. 2 and previously explained, with the exception that a battery 52 or equivalent source is used to provide the desired steady negative biasing voltage for the grids of the control tubes VT1 and VT2, rather than the grid capacitor 15 and resistor 16 shown in Fig. 2 for an oscillator organization. The primary of the grid transformer GT for governing the grids of the control tubes VT1 and VT2 is connected to the output circuit of a phase shifting device PS of a suitable type, which as shown comprises a transformer 53 with a center-tapped secondary associated with a capacitor 54 and resistor 55, either or both of which may be adjustable to provide the desired phase shift in a manner that will be obvious to those skilled in the art and requiring no detailed explanation. A current transformer IT, which has the usual structural and operating characteristics of current transformers commonly used in power lines for instrumentation purposes or the like, has its primary included in one of the power lines 51. A resistor 56, preferably with an adjustable slider, is connected across the secondary of this current transformer IT. The input circuit for the phase shifting device PS may be traced from the lower power wire 51, over wire 57, through the portion of the resistor 56 cut in by the slider, wire 58, through the primary of the transformer 53 of the phase shifting device PS, and wire 59 back to the other power wire 51. Thus, the voltage supplied to the phase shifting device PS is the vectorial sum of the line voltage plus a voltage proportional to and in phase with the line circuit.

Briefly outlining the contemplated mode of operation of this power factor correction device of Fig. 11, the phase shifting device PS, which may be of any suitable type, has a permanent setting or adjustment such that, when the current in the line circuit 51 is in phase with its voltage, i. e. for a unity power factor, the conduction through the power tube PT1 is cut off at approximately 90° with respect to the voltage EP1 of its primary P1, and is started at approximately 270°, corresponding with the condition indicated in Fig. 10E and previously explained. The conduction through the other power tube PT2 occurs at similar times with respect to the voltage EP2 of its primary P2. These conduction periods are provided in the same manner previously explained, and preferably with a slight overlap, by phase shifting the sinusoidal control voltage acting through the grid transformer GT with the appropriate negative biasing voltage.

Figure 12A:
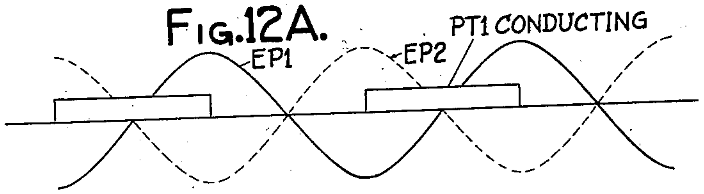
Figs. 12A, 12B and 12C are explanatory voltage curves for the grid control means of Fig. 11.
Figure 12B:
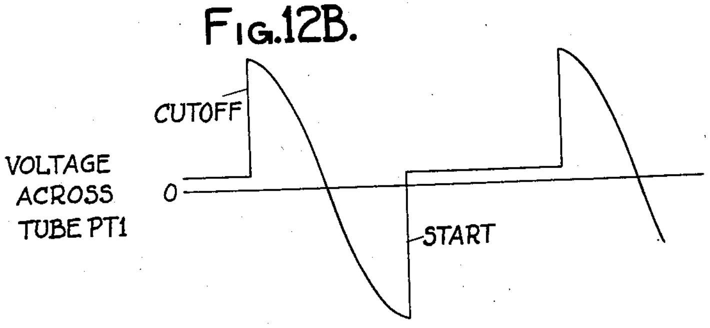
Figure 12C:
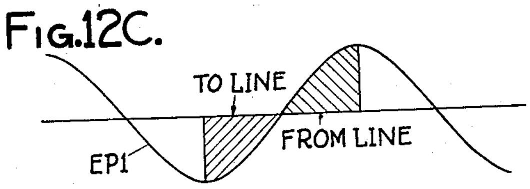

Under such conditions of control of the conduction periods of the power tubes PT1 and PT2 for unity power factor conditions of the power line 51, the same power or energy is transferred to and from the power line by the circuit organization including the power tubes PT1 and PT2, as indicated in Fig. 12C and also in Fig. 10E previously explained. Consequently, except for the relatively small losses in the power tubes PT1 and PT2, windings of the transformer T and the inductor L, the power factor correcting device of Fig. 11 does not affect the power line 51 under unity power factor conditions.

Assume now that the load on the power lines 51 draws some lagging current. This causes the voltage across the resistor 56 in the secondary of the current transformer IT to lag a corresponding amount with respect to the line voltage; and this in turn causes the input voltage to the phase shifting device PS to lag and retard the conduction periods of the power tubes PT1 and PT2. Such retardation of the conduction period for the tube PT1, for example, from the 270° for which it is set for unity power factor, as indicated in Figs. 12A to 12C, to a firing point at say 273°, has the effect, so to speak, of reducing the power transferred to the power line, as indicated by the left-hand shaded area in Fig. 12C, and increasing the power received from the power line, as represented by the other shaded area in Fig. 12C. The net transfer of power as a product of instantaneous currents and voltages, occurs early with respect to the line voltage, this is equivalent to drawing from the power line a leading current, much the same as a capacitor across the power line, thereby compensating for the lagging current drawn by the load.

It can be readily appreciated that the parts and circuits may be proportioned or adjusted such that a change in the lagging power factor will cause the appropriate shift in phase of the grid control voltages for the power tubes PT1 and PT2, and retard their conduction periods to the extent required to correct for lagging current drawn by the load. In this way, a circuit organization having the characteristics of this invention may be utilized as a power factor correction device to draw the appropriate amount of leading current from a power line, as and when required to compensate for lagging currents drawn by some load or loads on this line, and thereby simulate the condition of an in phase power factor load on the power line.

As previously noted, one of the characteristic features of this invention is that each one of the plurality of hard-vacuum power tubes, such as PT1 and PT2, is controlled to be fully conductive for its conduction period and until conduction through another tube is started. For many applications and uses of the invention it is considered preferable to provide separate control tubes, such as the tubes VT1 and VT2 of Figs. 2 and 5, for governing the grids of the power tubes PT1 and PT2 to obtain the desired conduction periods. For certain applications and with certain types of power tubes, however, it may be expedient and desirable to control the grids of the power tubes directly by the grid controlling voltage.

Figure 13:
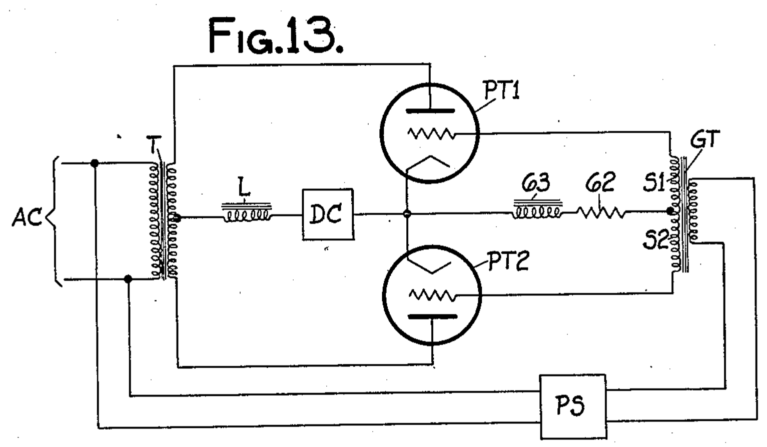
Fig. 13 shows the modified form of grid control means of Fig. 11 for single-phase operation.
Figure 14A:
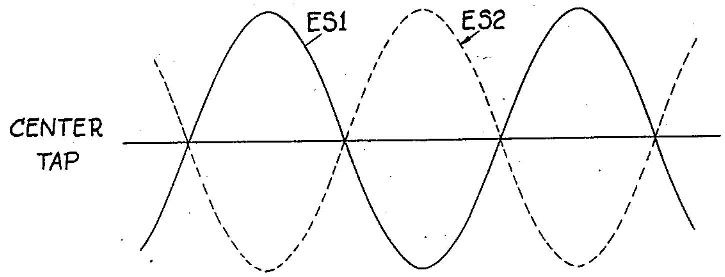
Figs. 14A and 14B are explanatory curves for the grid control arrangement shown in Fig. 13.
Figure 14B:
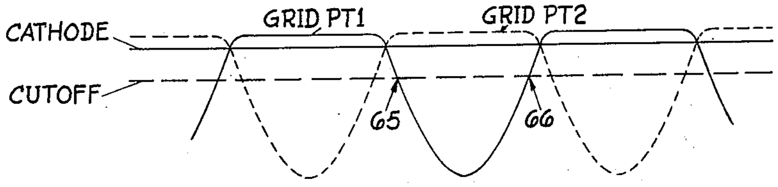

Fig. 13 illustrates one arrangement of this type for single phase operation. In this arrangement of Fig. 13, the windings S1 and S2 of the center-tapped secondary of the grid transformer GT are connected directly to the grids of the power tubes PT1 and PT2, with a relatively large resistance 62, and also if desired an inductance 63, included in the connection between the center tap of this grid transformer secondary and the cathodes of the power tubes PT1 and PT2. Assuming sinusoidal grid control voltages in the secondary windings S1 and S2 of the grid transformer, as indicated in Fig. 14A, the negative half-cycles of these grid control voltages act to maintain the grids of the power tubes PT1 and PT2 more negative than the cutoff grid potential for these tubes for the desired period of non-conduction, as indicated in Fig. 14B. For example, assuming a cutoff voltage for the power tube PT1 as indicated in Fig. 14B, this tube is non-conductive between points indicated at 65 and 66, which for reasons previously explained is preferably slightly less than a half-cycle, say 178°, of the alternating current voltage. The grid resistance 62, serves to limit the positive potential on the grids of the power tubes PT1 and PT2 due to the flow of grid current during the positive half-cycles of the grid control voltages of Fig. 14A, as indicated in Fig. 14B. It can be readily understood that amplitudes for the grid control voltages of Fig. 14A, and the values of the grid resistance 62 may be chosen, with due regard to the control characteristics of the power tubes PT1 and PT2, to obtain the desired control previously explained of the conduction periods for these power tubes.

The use of an inductor or reactor 63 of the appropriate inductance in the grid circuits of the power tubes PT1 and PT2, as shown in Fig. 13, is desirable, although not essential, because such an inductance acts to give a more uniform positive grid potential by tending to maintain a uniform flow of grid current during the positive half-cycle of grid voltage, rather than a positive grid potential increasing from a small value at the beginning of the positive half-cycle of grid voltage to a larger value at the peak of the voltage, as would be the case with a resistance only in the grid circuit. Also, this inductor 63 in the grid circuits of the tubes PT1 and PT2 assures an overlap in the conduction periods of these tubes desirable for reasons previously explained, since this inductor 63 tends to maintain continuous current in the grid circuits of these tubes. When the tube PT1 for example is conducting, the potential on its grid is maintained positive by the inductor 63 in spite of its grid control voltage, and its grid cannot go negative and stop conduction through this tube until the current through the inductor 63 can be taken over by the grid circuit of the other tube PT2. In other words, in spite of variations in the control voltages provided for the grids of the power tubes PT1 and PT2, the action of the inductor 63 in their grid circuits assures that each tube becomes conductive before conduction through the other tube is cut off.

Figure 15:
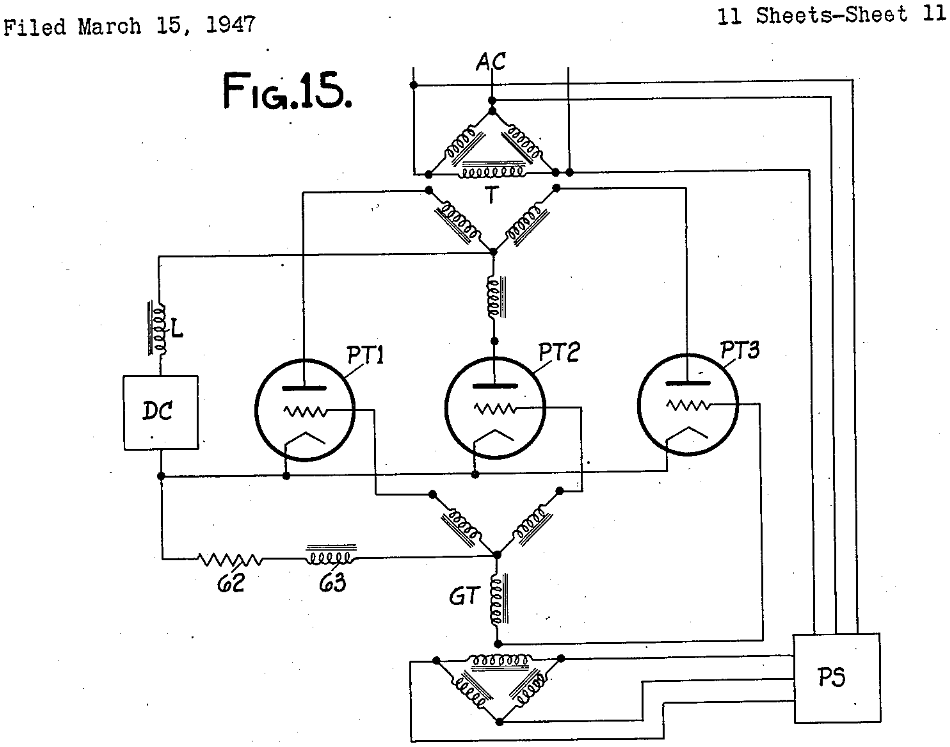
Fig. 15 shows the modified form of grid control means of Fig. 13 for polyphase operation.

This same type of grid control means of Fig. 13 may be applied to a polyphase organization, in the manner indicated in Fig. 15 for a three-phase power conversion device. Assuming three-phase voltages in the anode circuits of the power tubes PT1, PT2 and PT3, as indicated by solid dash and dotted lines in the explanatory curves of Fig. 16A, the secondary of the grid transformer GT will provide control voltages in a predetermined phase relation to these anode voltages determined by the phase shifting device. These grid control voltages may be assumed to be sinusoidal and to provide positive and negative voltage waves in the grid circuits of these tubes. The resistor 62, which is common to the grid circuits of these tubes, is selected to limit the grid current to some relatively small value for the peak value of the positive grid voltage selected, say a grid current in the order of 1 milliampere. The inductor 63 performs its usual function as an inductance tending to maintain this value of grid current for either one or two of the tubes then drawing grid current, as the case may be.

Figures 16A, 16B:
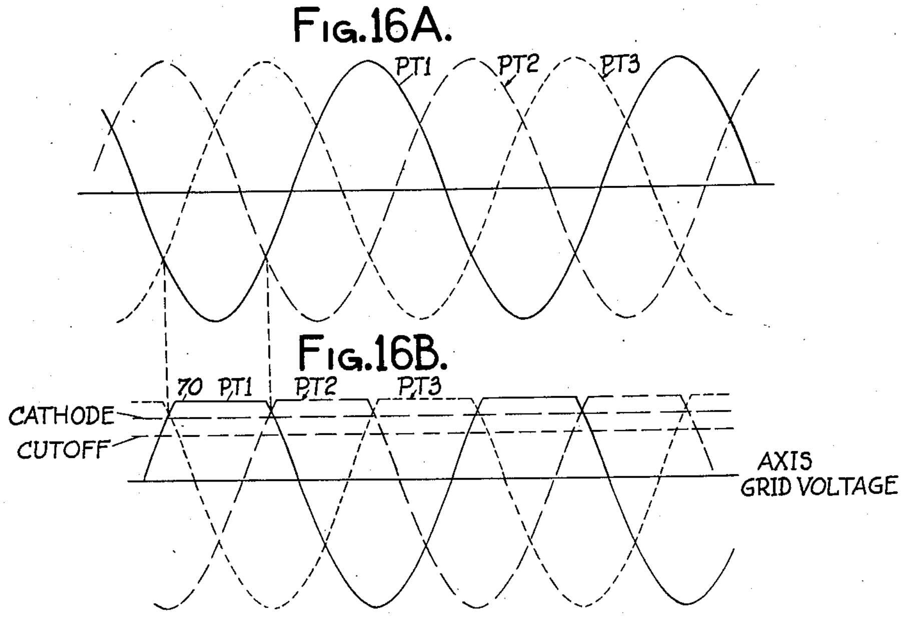
Figs. 16A and 16B are explanatory curves for the grid control arrangement shown in Fig. 13.

Assume that the grid control voltage for tube PT1, for example, is positive and this tube is conducting with its grid potential at some essentially uniform positive value determined by the resistor 62 and inductor 63, as indicated at 70 in Fig. 16B. When the grid control voltage in the secondary of the grid transformer GT for the tube PT2 for the next phase goes positive and starts to draw grid current, the total grid current for both tubes is limited by the inductor 63, and as the grid current for this next tube PT2 increases, it detracts from the grid current for the first tube PT1. The general effect is that a predetermined current flows through the resistor 63, and is maintained essentially uniform independently of the shifting of grid current from one tube to another. This current through the resistor 62 in a direction toward the grids of the tubes, provides a voltage drop through the resistor, which has the effect of a negative biasing voltage for the grids of the tubes. This may be considered as shifting the axis of the sine wave grid control voltages, as indicated in Fig. 16B, to a point where the positive half-cycles of the grid control voltage caused the predetermined grid current to flow to the tubes PT1, PT2 and PT3 in succession. This biasing voltage is automatically established in accordance with the amplitude of the grid control voltages and the amount of grid current permitted by the value of the resistor 62, and is such that each tube, when its grid potential becomes positive with respect to its cathode, draws its share of grid current and tends to reduce the grid current and potential on the grid for the next preceding tube. Thus, the grid potentials for the successive power tubes PT1, PT2, and PT3 are positive for approximately 120°, corresponding with the phase angle between the grid control voltages. The amplitude of the grid control voltages may be selected, in accordance with the operating characteristics of the tube and the negative cutoff voltage, such that conduction through each tube is cut off after conduction through the next tube is started, with the amount of overlap desired.

This type of grid control means, with its characteristic of automatically providing the appropriate biasing voltage for the tube, as distinctive from a fixed biasing voltage, together with the inductor 63, serves to provide the desired slightly overlapped periods of conduction of the tubes, independently of variations in the grid control voltage or a fixed biasing voltage. This is an advantageous arrangement under certain conditions where, as for example in the case of a magnatriode, relatively large grid control and grid biasing voltages are involved.

In the type of grid control means illustrated in Figs. 13 and 15, when the circuit organization of this invention is employed as an oscillator, oscillations may be initiated and built up when power is applied in the same manner characteristic of a typical class A amplifier, because under shut-down conditions the grids of the power tubes PT1 and PT2 are at zero potential, and these power tubes are all sufficiently conductive to enable oscillations to build up.

From the foregoing illustration and description of certain specific embodiments of the invention, it can be seen that the features characteristic of the invention may be employed to advantage in various situations where electron discharge tubes are used for converting power from direct current to alternating current, or from alternating current to direct current. Having two power circuits in the generic sense, in which alternating current and direct current flow respectively, it can be appreciated that either of these circuits may include the primary source of energy and the other circuit the load to be supplied with current from such source. If a plurality of hard vacuum tubes, preferably of the magnatriode type, are combined with such alternating current and direct current circuits in accordance with this invention, with a relatively large inductance in the direct current circuit and associated with the anode circuits of the tubes to provide an essentially uniform anode to cathode voltage or tube drop for each tube during its conduction period, and with the appropriate grid control means to provide essentially square wave or flat topped grid control voltages for these tubes to render them fully conductive throughout their respective conduction periods, then the power tubes will operate in the organization at a high plate efficiency, and transfer energy from one of the direct current and alternating current circuits to the other by conducting an uninterrupted series of blocks of current of essentially uniform amplitude. In this connection, as previously indicated, the plate efficiency of the organization of this invention is high because of the low losses in the tubes.

These characteristics of the invention are useful for power oscillators, amplifiers, inverters or the like for converting direct current to alternating current of a fixed or variable frequency, where the precise wave form of the alternating current is not critical and may be determined by the characteristics of the tank circuit or load. Similarly, the same general organization may be used to act as a rectifier with grid control to convert alternating current from any suitable source to a unidirectional or essentially direct current. For example, considering the organization for an oscillator as illustrated in Fig. 1, if the winding of the output transformer T shown connected to an output or tank circuit is supplied with alternating voltage from a suitable source, the same organization would act as a rectifier with grid control to supply current to a suitable direct current load substituted for such battery, or supply charging current to the battery 11 if its polarity is reversed in the circuit. In other words, the invention may be applied to any one of the various types of devices employing electron tubes, which may be conveniently termed power conversion devices or apparatus, and which in general involves an alternating current circuit and a direct current circuit, and may use either of these circuits as an input or an output.

Also, since this invention uses hard vacuum tubes, as distinctive from gas discharge tubes, conduction through the tubes may be stopped as well as started by the appropriate grid control; and consequently any suitable and convenient phase shifting arrangement may be employed to advance or retard the conduction periods of the tubes with respect to the voltage in the alternating current circuit. Such control or regulation of the time phase relation of the blocks of current conducted by the tubes with respect to the voltage in the alternating current circuit may be employed to obtain the effect of applying to, or drawing from, the alternating current circuit either lagging or leading currents, as may be desired to compensate for changes in the power factor of the alternating current circuit caused by variations in load conditions or the like.

Although, as previously explained, the features of this invention may be used to advantage within certain limitations with power triodes of the conventional and well known type, the preferred combination of the invention includes as an element a hard vacuum triode of the type conveniently termed a magnatriode, which has a cross-magnetizing magnetic field to prevent electron current to the control element or grid of the tube in spite of its relatively high positive potential. This characteristic of a magnatriode type tube enables substantial anode currents to be obtained without significant grid losses at the relatively low anode to cathode voltages desirable from the standpoint of low tube losses and high plate efficiency. The magnatriode type of tube is disclosed and claimed in other applications, but it has such characteristics that it constitutes a desirable and important element of the combination of this invention for many applications and uses.

While various aspects of the functions and characteristic features of this invention are exemplified in the different specific circuit organizations shown and described, it should be understood that various other adaptations, modifications and additions may be made in the organization and arrangement of parts and circuits, as shown and described, without departing from the invention.

What I claim is:

1. Power conversion apparatus of the type described comprising, in combination with an alternating current circuit and a direct current circuit, a plurality of electron discharge tubes each having a control element and disposed in a magnetizing field to prevent grid current for relatively high positive grid potentials, a circuit organization including a relatively large inductance and interconnecting said alternating current circuit and said direct current circuit to render said tubes effective to supply blocks of current during their conduction periods from one circuit to the other, and grid control means for applying relatively high and essentially uniform positive potentials to the control elements of said tube in turn to render them fully conductive in succession for a prolonged period and approximately until conduction through the next tube is started, said inductance acting to maintain an essentially uniform anode to cathode voltage for each tube during its conduction period.

2. Electrical power conversion apparatus comprising, in combination with a plurality of electron discharge tubes each having a control element capable of stopping as well as initiating conduction through that tube, an alternating current circuit, a direct current circuit, a circuit organization including a transformer and a relatively large inductance for interconnecting said tubes and said alternating current and direct current circuits for transfer of current pulses from one circuit to the other during the conduction periods of said tubes, said inductance being large enough to maintain continuous current in said direct current circuit, and means for abruptly changing the controlling condition of said control elements of said tubes in turn and thereby render each tube fully conductive for a prolonged period approximately until conduction through another tube is started, whereby a series of blocks of current having their amplitude maintained essentially uniform by said inductance are transferred from one to the other of said alternating current and direct current circuits.

3. Power conversion apparatus of the character described comprising, in combination with an alternating current circuit and a direct current circuit, a circuit organization including a plurality of high vacuum power tubes and a relatively large inductance for interconnecting said alternating current and direct current circuits for transfer of current pulses during the conduction periods of said tubes from one circuit to the other, each of said tubes having a grid capable of stopping as well as starting conduction through that tube, means for providing control voltages for the grids of said tubes to change said tubes abruptly in turn from a condition of non-conduction to a condition of full conduction in a predetermined phase relation to the voltage in said alternating current circuit, said inductance being sufficiently large to maintain continuous current in the direct current circuit at the frequency of said alternating current circuit, whereby energy is transferred from one to the other of said alternating current and direct current circuits in an uninterrupted series of blocks of current of essentially uniform amplitude.

4. In power conversion apparatus of the character described, in combination with an alternating current circuit and a direct current circuit, a plurality of hard vacuum electron discharge tubes each having a grid capable of stopping as well as starting conduction through the tube, each of said tubes being disposed in a magnetic field to prevent electron current to its grid in spite of its relatively high positive potential, circuit elements interconnecting said tubes with said alternating current and direct current circuits to transfer current from one circuit to the other during the conduction periods of said tubes, grid control means for abruptly changing the potentials on the grids of said tubes in turn from a negative value beyond cut-off to a relatively high and uniform positive value in a predetermined phase relation to the voltage in said alternating current circuit, said grid control means rendering each tube fully conductive for a prolonged period until conduction through another tube is started, and means including a relatively large inductance included in the anode circuits of said tubes for maintaining an essentially uniform anode to cathode voltage during their conduction periods.

5. Power conversion apparatus of the character described for governing the exchange of energy between alternating current and direct current circuits comprising in combination, a plurality of electron discharge tubes of the high vacuum type each having a control element capable when sufficiently negative of stopping conduction through the tube with a positive voltage on its anode, each tube being disposed in a magnetic field to prevent electron current to its grid for relatively high positive potentials thereon, and grid control means for abruptly changing the potential on the control elements of said tubes in turn in a predetermined phase relation to the voltage in the alternating current circuit from a negative value beyond cutoff to a relatively high uniform positive potential, said grid control means rendering each tube fully conductive for a prolonged period approximately until conduction through another tube is started.

6. A power oscillator of the vacuum tube type comprising, in combination with a resonant tank circuit, a circuit organization including a plurality of high vacuum electron discharge tubes and a source of direct current for supplying blocks of current of different polarity to said tank circuit during the conduction periods of said tubes, grid control means governed by said tank circuit for providing positive half-cycles, the grid control voltages provided by said grid control means acting to change said tubes from a condition of non-conduction to a condition of full conduction quickly for a period somewhat longer than a half cycle of the frequency of said tank circuit so that conduction through a tube is not cut-off until conduction through another tube is started, and means including a relatively large inductance included in the anode circuits of said tubes to provide an essentially uniform anode to cathode voltage for each tube during its conduction period.

7. A power oscillator of the vacuum tube type comprising, in combination with a tuned output circuit and a source of direct current, a circuit organization including a plurality of hard vacuum tubes for supplying blocks of current from said circuit direct current source to said output circuit during the conduction periods of said tubes, each of said tubes having a grid capable of stopping flow of anode current with a positive anode voltage, and grid control means for abruptly changing the potentials on the grids of said tubes in turn from a negative value beyond cutoff to an essentiallly uniform positive value in a predetermined phase relation to the voltage in said output circuit, said grid control means acting to maintain the uniform positive potential on the grid of each tube throughout its conduction period corresponding with a half-cycle of the alternating current voltage in said output circuit.

8. In a power conversion apparatus of the character described, in combination with an alternating current circuit and a direct current circuit, a circuit organization including a plurality of hard vacuum electron discharge power tubes each having a grid capable of stopping conduction through the tube with its anode voltages positive, each of said tubes being disposed in a magnetic field to prevent electron current to the grid in spite of a relatively high positive potential on such grid, means including a source of biasing voltage for providing a uniform positive potential for the grids of said power tubes, grid control means including a plurality of control tubes each having a resistance in its anode circuit for changing the grid potential of the associated power tube from the positive value provided by said biasing means to a negative value beyond cutoff when each control tube becomes conductive, and means for rendering said control tubes conductive in turn to define the conduction periods for said power tubes.

9. Electrical power conversion apparatus of the character described for transferring blocks of current between alternating current and direct current circuits comprising, a plurality of electron discharge power tubes each having a control element capable of stopping conduction through the tube with a positive voltage on its anode, a corresponding plurality of hard vacuum control tubes, and grid control means including said control tubes and responsive to sinusoidal voltages derived from said alternating current circuit for providing essentially uniform positive potentials on the control elements of said power tubes in turn, said grid control means changing each of said power tubes from a condition of non-conduction to a condition of full conduction for a prolonged conduction period approximately until conduction through another power tube is started.

10. In power conversion apparatus of the character described for governing the transfer of energy between alternating current and direct current circuits comprising in combination, a plurality of power tubes each having a control element capable of stopping as well as starting conduction through the tube, control means for the control elements of said power tubes including a voltage source and a plurality of control tubes, said voltage source acting to provide a predetermined positive potential for the control elements of said power tubes and anode voltages for said control tubes, each of said control tubes acting when conductive to abruptly change the positive potential on the control element of the associated power tube provided by said voltage source to a negative value beyond cutoff, and means for rendering said control tubes conductive in turn for predetermined periods.

11. A power oscillator for converting direct current to alternating current comprising in combination, a source of direct current, a resonant tank circuit, a plurality of power tubes having anode circuits associated with said source of direct current for supplying blocks of current to said tank circuit during the conduction periods of said tubes, each of said power tubes having a control element capable of stopping as well as starting conduction through the tube, a relatively large inductance in the anode circuits of said power tubes, a corresponding plurality of hard vacuum control tubes having their anode circuits operatively connected with the control elements of said power tubes, and means including said control tubes and responsive to an alternating current voltage derived from said tank circuit and abruptly changing the potentials of the control elements of said power tubes to render each tube non-conductive and fully conductive in turn, said means including a capacitor and resistor for the grids of said control tubes to provide a negative bias for said grids in accordance with the amplitude of the oscillations.

12. In power conversion apparatus of the character described, in combination with an alternating current circuit and a direct current circuit, of means including a plurality of power tubes for transferring blocks of current from one of said circuits to the other during the conduction periods of said tubes, each of said power tubes having a control element capable of stopping as well as starting conduction through the tube, a plurality of hard vacuum control tubes, grid control means including said control tubes for abruptly changing the potential on the control element of each of said power tubes in turn from a negative value beyond cutoff to an essentially uniform positive value, said grid control means including a grid transformer having center-tapped secondary windings, connections between said secondary windings and the respective grids of said control tubes, and a relatively high resistance in the grid circuits of said control tubes for limiting the positive grid potential of said tubes as the secondary voltage of said grid transformer makes said grids positive.

13. In power conversion apparatus of the character described, in combination with a transformer, a source of direct current, a pair of power tubes of the high vacuum type supplying blocks of current from said direct current source to said transformer, each of said tubes having a control element capable of stopping as well as starting conduction through the tube, a pair of control tubes acting when rendered conductive to abruptly shift the potential of the control element of an associated power tube from a negative value beyond cutoff to an essentially uniform positive value, and means including other tubes organized in a multi-vibrator circuit for governing the grids of said control tubes.

14. In power conversion apparatus of the vacuum tube type described, the combination with an alternating current circuit and a direct current circuit, a circuit organization including a plurality of hard vacuum electron discharge tubes for interconnecting said alternating current and direct current circuits to provide for transfer of current from one circuit to the other during the conduction periods of said tubes, each of said tubes having a grid capable of stopping as well as starting conduction through the tube, grid control means responsive to sinusoidal alternating voltages to provide grid control voltages of said tubes having essentially flat topped positive half-cycles, said grid control means acting to render said tube fully conductive in turn until conduction through another tube is started, and means including a phase shifting device for supplying voltages to said grid control means in a controllable phase relation with respect to the voltage in said alternating current circuit, whereby the conduction periods of said tubes may be controlled to give blocks of current in a desired phase relation to the voltage in said alternating current circuit.

15. In power conversion apparatus of the character described, a circuit organization including a plurality of electron discharge tubes for interconnecting an alternating current circuit and a direct current circuit and providing for the transfer of blocks of current during the conduction periods of said tubes from one circuit to the other, each of said tubes having a grid capable of stopping as well as starting conduction through that tube when its anode voltage is positive, grid control means for governing the potentials on the grids of said tubes to render them conductive in succession for prolonged periods and until conduction through another tube is started, said circuit organization including a lumped inductance for preventing current in the anode circuits of said tubes falling below a predetermined minimum, and means for governing said grid control means to vary the phase relation of the periods of conduction through said tubes with respect to the voltage in the alternating current circuit.

16. Power conversion apparatus of the character described comprising, an output transformer having a plurality of windings with a center tap connection, a plurality of electron discharge tubes having their anodes connected to the terminals of said transformer windings, each of said tubes having a grid capable of cutting off conduction through that tube with its anode voltage positive, a relatively large inductance for maintaining continuous current through the anode circuits of said tubes at the frequency of the alternating voltages in said transformer, and means for abruptly changing the potentials on the grids of said tubes between cutoff and full conduction to render said tubes fully conductive in succession, whereby blocks of current of essentially uniform amplitude are supplied to said output transformer at a substantially uniform tube drop during the conduction periods of said tubes.

17. In power conversion apparatus of the character described, an alternating current circuit and associated load capable of changing the power factor of said alternating current circuit, a plurality of hard vacuum electron discharge tubes each having a control element capable of stopping as well as starting conduction through the tube, a transformer, anode circuits for said tube including a relatively large inductance and coupled to said alternating current circuit by said transformer, grid control means responsive to an alternating current grid control voltage for rendering each of said tubes fully conductive in turn for a prolonged period approximately until conduction through another tube is started, and means for varying the phase relation of said grid control voltage and the voltage in said alternating current to advance or retard the conduction periods of said tubes and compensate for changes in the power factor of said alternating current circuit.

18. A polyphase oscillator of the vacuum tube type comprising in combination, a polyphase transformer having star-connected primary windings, a source of direct current, a relatively large inductance, a plurality of power tubes having anode circuits including said source of current and connected across the primary windings of said transformer, each of said power tubes having a control element capable of stopping conduction through the tube with a positive voltage on its anode, a voltage source tending to provide a uniform positive potential for the control elements of said power tubes, a plurality of control tubes each having a grid and acting when conductive to change the positive potential on the control element of the associated power tube from the positive potential provided by said voltage source to a negative potential beyond cutoff, a grid control means responsive to sinusoidal voltages derived from said transformer for governing the grids of said control tubes, said grid control means including means for providing a biasing voltage for the grids of said control tubes changing from a negative value when the oscillator is first started to a predetermined positive value after a short time interval.

19. Polyphase power conversion apparatus of the character described comprising, alternating current circuits and a direct current circuit interconnected by a polyphase transformer, a plurality of electron discharge tubes of the high vacuum type each having a control element for stopping as well as starting conduction through the tube, circuit elements interconnecting the anode circuits of said tubes with said direct current circuit and the respective phase windings of said transformer, a plurality of control tubes each having a grid and each acting when conductive to abruptly change the potential of the control element of an associated power tube from a negative beyond cutoff to a substantially uniform positive potential, a grid transformer for supplying sinusoidal grid control voltages to the grids of said control tubes in a predetermined phase relation to the voltages of said transformer, and means providing a substantially uniform positive biasing voltage for grids of said control tubes to render them conductive for approximately the number of electrical degrees of the phase angle between the different voltages of said polyphase transformer.

20. Power conversion apparatus of the character described comprising in combination, an alternating current circuit and a direct current circuit including a relatively high inductance, a circuit organization including a plurality of high vacuum power tubes for transferring current from one of said circuits to the other during the conduction periods of said tubes, each of said tubes having a control grid increasing anode current with a positive potential thereon and receiving electron current when such positive potential exceeds an established value for a given anode current, grid control means for applying alternating voltages to the grid circuits of said tubes in a predetermined phase relation to the alternating voltages in said alternating current circuit, said grid circuits including resistance and inductance to automatically reduce the positive grid potential in accordance with the flow of grid current and to maintain a positive grid potential for each tube in turn until the grid of the next tube draws grid current, whereby conduction is maintained through each tube in turn until conduction through the next tube has been started.

21. Power conversion apparatus of the character described comprising, a source of anti-directional current, an output transformer having its secondary connected to an alternating current circuit, a pair of high vacuum power electron discharge tubes connected in a push-pull arrangement with the primary of said output transformer and said current source, each of said power tubes having a control grid capable of stopping as well as permitting conduction through the tube, an inductor in series with said current source large enough to maintain an essentially uniform anode-to-cathode voltage for said power tubes during their conduction periods, grid control means including a source of fixed grid voltage and associated resistors tending to establish a substantially uniform grid controlling potential rendering said power tubes fully conductive, a pair of control tubes each operable to conduct current through a corresponding resistor to change abruptly the potential on the grid of the associated power tube from its substantially uniform value for full conduction to a negative value beyond cutoff, and means rendering said control tubes alternately conductive in a predetermined phase relation to the voltage in the alternating current output circuit for periods slightly less than a half cycle of said voltage, whereby each of said power tubes is controlled to be conductive before conduction through the other power tube is cut off and there is no interruption of current through said inductor.

22. A power conversion device comprising, in combination with a source of direct current and an output transformer having a plurality of primary windings, two high vacuum controllable electron discharge tubes connected in a push-pull arrangement with said source and the primary windings of said transformer, each of said tubes having a control element capable of stopping as well as permitting conduction through the tube, said tubes being disposed in a cross-magnetizing magnetic field enabling relatively high positive potentials to be applied to said control element without receiving excessive electron current, a relatively large inductance in series with said direct current source and acting to maintain a substantially uniform voltage across each tube when conducting in spite of the voltage variations in the corresponding transformer primary, and grid control means including a source of fixed grid voltage and a pair of control tubes rendered conductive in a predetermined phase relation to the alternating voltage in said transformer, said grid control means acting to shift the potentials on said control elements of said tubes alternately from a negative value beyond cutoff abruptly to a substantially uniform positive value for full conduction through the tube during the periods slightly more than 180 electrical degrees during the successive half cycles of the output voltage, whereby blocks of current of essentially uniform amplitude are supplied from the direct current source to the windings of said transformer at a low tube drop voltage provided by the cooperation of said inductance with the direct current source, and each tube is maintained fully conductive in turn until the next tube can conduct to avoid interruption of current through said large inductance.

DONALD V. EDWARDS.

REFERENCES CITED

The following references are of record in the file of this patent:

UNITED STATES PATENTS

| Number | Name | Date |
|---|---|---|
| 1,347,894 | Chubb | July 27, 1920 |
| 1,699,153 | Mittag | Jan. 15, 1929 |
| 1,725,053 | Brown et al. | Aug. 20, 1929 |
| 1,743,152 | McLachlan | Jan. 14, 1930 |
| 1,893,019 | Culver | Jan. 3, 1933 |
| 1,930,976 | Kern | Oct. 17, 1933 |
| 1,935,460 | Schmidt | Nov. 14, 1933 |
| 2,080,250 | Bedford | May 11, 1937 |
| 2,288,362 | McArthur | June 30, 1942 |
| 2,288,363 | McArthur | June 30, 1942 |
| 2,294,797 | Nelson | Sept. 1, 1942 |
| 2,377,456 | Spitzer | June 5, 1945 |
| 2,428,604 | Angier | Oct. 7, 1947 |